(12) United States Patent
Miller et al.

(10) Patent No.: US 8,490,871 B1
(45) Date of Patent: Jul. 23, 2013

(54) METHOD AND SYSTEM FOR PRODUCT RESTOCKING USING MACHINE-READABLE CODES

(75) Inventors: Kevin C. Miller, Herndon, VA (US); Andrew J. Doane, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 124 days.

(21) Appl. No.: 13/096,863

(22) Filed: Apr. 28, 2011

(51) Int. Cl.
*G06K 5/00* (2006.01)

(52) U.S. Cl.
USPC .......................................... 235/380; 235/375

(58) Field of Classification Search
USPC .................... 235/375, 383, 381, 380; 705/31, 705/35, 22, 2
See application file for complete search history.

(56) References Cited

U.S. PATENT DOCUMENTS

| | | | |
|---|---|---|---|
| 4,977,595 A | 12/1990 | Ohta et al. | |
| 5,969,324 A | 10/1999 | Reber et al. | |
| 6,024,281 A | 2/2000 | Shepley | |
| 6,213,391 B1 | 4/2001 | Lewis | |
| 6,652,455 B1 | 11/2003 | Kocher | |
| 6,866,194 B2 * | 3/2005 | Scheurer | 235/385 |
| 6,904,136 B1 | 6/2005 | Cook | |
| 7,308,429 B1 | 12/2007 | Tozzi | |
| 7,617,132 B2 | 11/2009 | Reade et al. | |
| 7,831,439 B1 | 11/2010 | Bryar et al. | |
| 7,999,674 B2 | 8/2011 | Kamen | |
| 2002/0027164 A1 | 3/2002 | Mault et al. | |
| 2002/0139846 A1 | 10/2002 | Needham et al. | |
| 2004/0060986 A1 | 4/2004 | Bean et al. | |
| 2004/0122771 A1 | 6/2004 | Celi, Jr. et al. | |
| 2004/0172281 A1 | 9/2004 | Stanners | |
| 2005/0137986 A1 | 6/2005 | Kean | |
| 2006/0065733 A1 | 3/2006 | Lee et al. | |
| 2007/0059672 A1 | 3/2007 | Shaw | |
| 2007/0250714 A1 | 10/2007 | Kawada | |
| 2008/0059372 A1 | 3/2008 | Lee et al. | |
| 2008/0086387 A1 | 4/2008 | O'Rourke et al. | |
| 2008/0223928 A1 * | 9/2008 | Wagner et al. | 235/383 |
| 2008/0243702 A1 | 10/2008 | Hart et al. | |
| 2009/0292617 A1 | 11/2009 | Sperling et al. | |
| 2009/0313145 A1 | 12/2009 | Hamilton et al. | |

(Continued)

OTHER PUBLICATIONS

U.S. Appl. No. 13/028,986, filed Feb. 16, 2011, Michal J. Geller et al.

(Continued)

*Primary Examiner* — Thien M Le
(74) *Attorney, Agent, or Firm* — Knobbe, Martens, Olson and Bear, LLP.

(57) ABSTRACT

The present disclosure provides a number of systems and associated processes for using machine-readable codes to perform a transaction. Embodiments of the present disclosure provide a system and associated processes for consolidating and replacing various forms of payment (e.g. credit cards, debit cards, and cash) with a single payment system. Further, embodiments of the present disclosure provide a system and associated processes for reordering a product provided by a product provider. Moreover, embodiments of the present disclosure provide a system and associated processes for accepting a gift, or gift transaction, associated with a gift card. In addition, embodiments of the present disclosure provide a system and associated processes for performing an Automatic Teller Machine (ATM) transaction using a machine-readable code.

21 Claims, 15 Drawing Sheets

U.S. PATENT DOCUMENTS

| | | | |
|---|---|---|---|
| 2010/0131343 | A1 | 5/2010 | Hamilton et al. |
| 2010/0161345 | A1* | 6/2010 | Cain et al. .................. 705/2 |
| 2011/0139868 | A1 | 6/2011 | Baker |
| 2011/0186624 | A1* | 8/2011 | Wagner et al. ............. 235/375 |
| 2011/0264570 | A1* | 10/2011 | Houseworth et al. ........ 705/31 |
| 2011/0318717 | A1 | 12/2011 | Adamowicz |
| 2012/0005222 | A1 | 1/2012 | Bhagwan et al. |
| 2012/0054046 | A1 | 3/2012 | Albisu |
| 2012/0109762 | A1 | 5/2012 | Getchius |
| 2012/0185398 | A1 | 7/2012 | Weis et al. |
| 2012/0254196 | A1 | 10/2012 | Abramski et al. |

OTHER PUBLICATIONS

Kharif, Olga. "Apple Plans Services That Let Iphone User Pay With Handsets" (http://www.bloomberg.com/news/2011-01-25/apple-plans-service-that-lets-iphone-users-pay-with-handsets.html) dated Jan. 24, 2011 in three pages. Downloaded on Apr. 16, 2012.

Roger. "Starbucks Test QR Code Payment" (http://2d-code.co.uk/starbucks-qr-code-payment/) dated Sep. 23, 2009 in four pages. Downlaoded on Apr. 16, 2012.

* cited by examiner

METHOD AND SYSTEM FOR PRODUCT RESTOCKING USING MACHINE-READABLE CODES

RELATED APPLICATIONS

| application Ser. No. | Filing Date | Title |
| --- | --- | --- |
| 13/096,812 | Apr. 28, 2011 | METHOD AND SYSTEM FOR USING MACHINE-READABLE CODES TO PERFORM A TRANSACTION |
| 13/096,897 | Apr. 28, 2011 | METHOD AND SYSTEM FOR USING MACHINE-READABLE CODES TO PERFORM TRANSACTIONS |
| 13/096,855 | Apr. 28, 2011 | METHOD AND SYSTEM FOR USING MACHINE-READABLE CODES TO TRACK CONSUMPTION |
| 13/096,844 | Apr. 28, 2011 | METHOD AND SYSTEM FOR USING MACHINE-READABLE CODES TO MAINTAIN ENVIRONMENTAL IMPACT PREFERENCES |
| 13/096,804 | Apr. 28, 2011 | METHOD AND SYSTEM FOR USING MACHINE-READABLE CODES TO IDENTIFY PHARMACEUTICAL INTERACTIONS |

BACKGROUND

Machine-readable codes, such as barcodes and matrix barcodes, can be used to encode or represent data. These machine-readable codes can be read or scanned by specially designed optical scanners, i.e. barcode readers. Originally, machine-readable codes were limited in application due to the small amount of data that could be encoded. Further, the need for special optical scanners also limited the environments that could use machine-readable codes.

Today, technology has advanced such that machine-readable codes can be used to encode a much greater amount of information than the original linear barcodes. Further, it is now possible to use digital cameras to read barcodes. These digital cameras have become almost ubiquitous thanks in large part to the number of mobile phones that come equipped with cameras. Thus, the potential uses for machine-readable codes have also greatly increased.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF SPECIFIC EMBODIMENTS

Introduction

Figure 1:
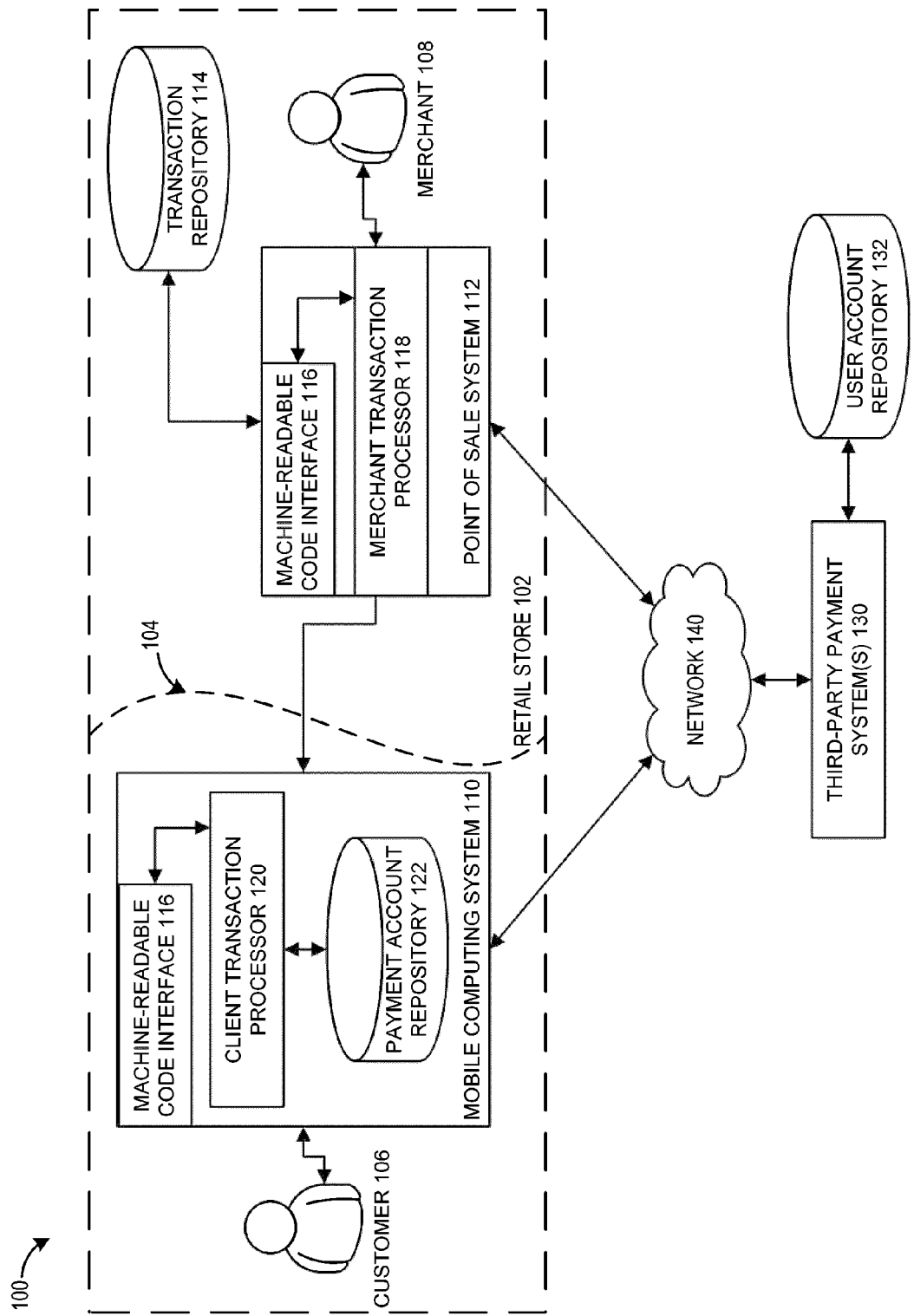
FIG. 1 illustrates an embodiment of a transaction environment that can use machine-readable codes to facilitate a transaction.

One embodiment of the present disclosure provides a system and associated processes for consolidating and replacing various forms of payment (e.g. credit cards, debit cards, and cash) with a single payment system. In one embodiment, the system can include one or more of a client system and a merchant system. The client system can read a machine-readable code generated by a merchant system associated with a merchant, or other product or service provider, and present the information encoded by the machine-readable code to a customer, or other product or service purchaser. Preferably, this machine-readable code includes at least enough information for the customer to determine whether to complete the transaction. For example, the machine-readable code can include an identity of the product or service being purchased, price information associated with the product or service, and a return policy associated with the merchant. In one embodiment, upon receiving confirmation that the customer desires to proceed with the transaction, the client system can initiate payment by contacting a payment system associated with the customer. This payment system can then transfer payment to the merchant by, for example, transferring cash from the customer's account or using credit associated with the customer's account. Thus, embodiments of the present disclosure enable a customer to complete a transaction without using, for example, cash, a credit card, or a debit card.

One embodiment of the present disclosure provides a system and associated processes for reordering or restocking a product provided by a product provider. The system can read a machine-readable code associated with a product. Generally, the machine-readable code is made available by the product provider and identifies at least the product and the customer. The customer can use the system to scan the machine-readable code indicating a desire to purchase a resupply of the product and causing the product provider to ship the resupply to the customer. In one embodiment, the system and associated processes can be used to reorder a service, such as a carpet cleaning service.

One embodiment of the present disclosure provides a system and associated processes for accepting a gift, or gift transaction, associated with a gift card. The system can read a machine-readable code associated with the gift card. Generally, the gift card is created by a retail gift provider on behalf of a gift giver and identifies the gift product or service and the gift recipient. In some embodiments, a third-party may generate the gift card on behalf of the retail gift provider, the gift giver, or both. The gift recipient can use the system to scan the machine-readable code indicating a desire to accept the gift. In some embodiments, the gift recipient can confirm or update transaction details associated with the gift transaction (e.g. the product identity or the shipping address). Advantageously, in some embodiments, the ability to confirm gift transaction details can reduce costs associated with shipping unwanted items or shipping the gift to the wrong location. In one embodiment, changes to the gift transaction by the gift recipient can be stored by the retail gift provider and/or provided to the gift giver to facilitate future gift transactions.

One embodiment of the present disclosure provides a system and associated processes for performing an Automatic Teller Machine (ATM) transaction using a machine-readable code. Advantageously, in some embodiments, using the machine-readable code eliminates the need for a debit card, credit card, or other cash-withdrawal card or token for interacting with an ATM. In one embodiment, the system can communicate a desired ATM transaction with a bank. The system can then receive a machine-readable code associated with the desired ATM transaction. By providing the machine-readable code to the ATM, the system can complete the desired transaction. In one embodiment, the system can be used to exchange a token, check, or money slip associated with a machine-readable code for cash.

Many variations of these example systems and associated processes are described below in more detail with reference to the drawings. Further, in some cases, one or more of the various embodiments and systems can be combined into fewer embodiments or systems.

Example Product Purchase Transaction Environment

FIG. 1 illustrates an embodiment of a transaction environment 100 that can use machine-readable codes to facilitate a transaction. The machine-readable codes can include any type of code that can encode information including various linear barcodes and matrix or 2D barcodes. For example, the machine-readable code can be a Quick Response ("QR") code, a Datamatrix code, a High Capacity Color Barcode, a Shotcode, an Aztec Code, or a MaxiCode, to name a few.

The transaction environment 100 includes a retail store 102 that represents any provider of a product or service. For example, the retail store 102 can be a clothing store, a grocery store, an electronics store, a hair salon, or a car mechanic, to name a few. To simplify discussion, the rest of this disclosure will describe the retail store 102 as a product provider. Generally, the retail store 102 represents a brick-and-mortar store. However, in some embodiments, the retail store 102 can be an Internet-based store or ecommerce website. Advantageously, in some embodiments, the machine-readable code can serve as a credit card replacement in both the brick-and-mortar realm as well as the ecommerce realm by facilitating interactions with third-party payment systems 130 via a mobile computing system 110. Further, in some embodiments, the retail store 102 can represent a product provider associated with both a brick-and-mortar store and an Internet-based store.

Divider 104 is intended to represent a conceptual division between the customer 106, and the retail store 102 and the merchant 108. Thus, the mobile computing system 110 to the left of the divider 104 is associated with the customer 106 and the point of sale system 112 and transaction repository 114 to the right of the divider 104 are associated with the retail store 102.

In one embodiment, the customer 106 can present to the merchant 108, or identify to the merchant 108, a product (not shown) that the customer is considering purchasing. The merchant 108 can then provide information associated with the product to the point of sale system 112, such as by typing in the information or by scanning a machine-readable code associated with the product. Alternatively, the customer 106 presents the product directly to the point of sale system 112, as occurs with self-checkout systems, and the point of sale system 112 can then obtain the information associated with the product from a machine-readable code associated with the product, a database, or both. The point of sale system 112 can include a machine-readable code interface 116 and a merchant transaction processor 118.

The machine-readable code interface 116 can include any system configured to read or scan a machine-readable code. For example, the machine-readable code interface 116 can include a barcode scanner, a camera, or an optical reader, to name a few. In some embodiments, the machine-readable code interface 116 can be configured to present a machine-readable code enabling another device with a machine-readable code interface to read or scan the machine-readable code. For example, the machine-readable code interface 116 associated with the mobile computing system 110 can scan or read a machine-readable code presented by the machine-readable code interface 116 associated with the point of sale system 112.

The merchant transaction processor 118 can include any system that can create and process machine-readable codes. These machine-readable codes can be associated with various transaction details including information associated with the product, information associated with the retail store 102, and information associated with a completed transaction.

Once a machine-readable code associated with transaction details has been created, the customer 106 can use the mobile computing system 110 associated with the customer 106 to read or scan the machine-readable code. The mobile computing system 110 can generally include any mobile computing device, such as cellular phones, smart phones, PDAs, tablets, portable video game devices, and portable music players, to name a few. The mobile computing system 110 can include a machine-readable interface 116 to read or scan the machine-readable code. Further, the mobile computing system 110 can include a client transaction processor 120. The client transaction processor 120 can include any system that can translate the transaction details associated with the machine-readable code into a human-readable form and cause the human-readable transaction details to be presented to the customer 106. Further, the client transaction processor 120 can include any system that can initiate a payment on behalf of the customer 106 to the retail store 102.

If the customer 106 approves of the transaction as defined by the transaction details translated into human-readable form, the mobile computing system 110 can cause the third-party payment system 130 to pay the retail store 102 the amount specified by the transaction details. The third-party payment system 130 can include any system that can pay a payee on behalf of a payer. For example, the third-party payment system 130 can be a bank, a credit provider, such as a credit card company, or an online payment service, such as PayPal® and Google Checkout®, to name a few. In one embodiment, the mobile computing system 110 can communicate in a wired or wireless manner with the third-party payment system 130 via network 140. The network 140 may include any system for allowing multiple computing devices to communicate with each other. For example, the network 140 can be a LAN, a WAN, the Internet, a cellular telephony network, combinations of the same, or the like. Further, the network 140 can be wired, wireless, or a combination of the same.

In one embodiment, if the customer 106 approves of the transaction, the customer 106 can provide a money slip associated with a pre-defined value to the merchant 108. The money slip is described in more detail with respect to FIG. 12 below. The merchant 108 can then use the process 1400 described in FIG. 14 below to cash or deposit the money slip. Further, the money slip can be created using the process 1300 described in FIG. 13 below.

In one embodiment, to access an account associated with the customer 106, the customer 106 provides account access information to the third-party payment system 130. The third-party payment system 130 can store account information associated with the customer's 106 account in the user account repository 132. The user account repository 132 can also be used to store merchant account information associated with the retail store 102. In one embodiment, each third-party payment system 130 is associated with its own user account repository 132. Alternatively, two or more third-party payment systems 130 may use the same account repository 132.

As part of the payment process, the third-party payment system 130 can communicate with the point of sale system 112 via the network 140. The third-party payment system 130 can provide a confirmation that the customer 106 has caused payment to be transferred from an account associated with the customer 106 to an account associated with the retail store 102. The point of sale system 112 can store a record of the completed transaction in the transaction repository 114. Further, the point of sale system 112 can provide the mobile computing system 110 with access to another machine-readable code that can serve as a receipt for the completed transaction. The mobile computing system 110 can store this receipt in the payment account repository or an alternative repository (not shown) designated for the storage of transaction receipts.

Example Transaction Authorization Process from a Customer Perspective

Figure 2:
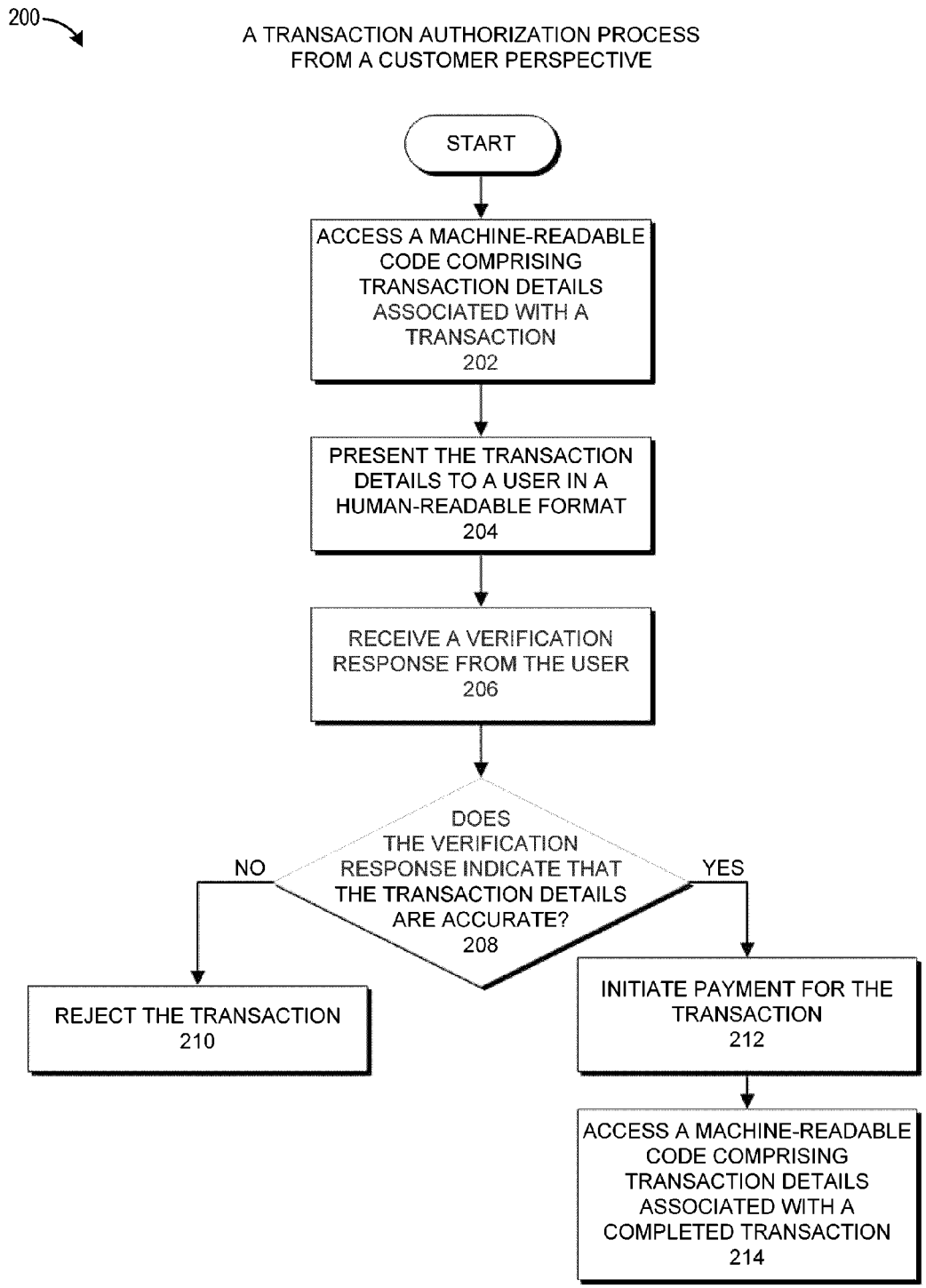
FIG. 2 illustrates a flow diagram for one embodiment of a transaction authorization process from a customer perspective.

FIG. 2 illustrates a flow diagram for one embodiment of a transaction authorization process 200 from a customer perspective. The process 200 can be implemented by any system that can access a machine-readable code and initiate a payment transaction. For example, the process 200, in whole or in part, can be implemented by the mobile computing system 110, the machine-readable code interface 116, or the client transaction processor 120, to name a few. Although any number of systems, in whole or in part, can implement the process 200, to simplify discussion, the process 200 will be described as being generally implemented by the client transaction processor 120.

The process 200 begins at block 202, where, for example, the client transaction processor 120 accesses a machine-readable code comprising transaction details associated with a transaction. The transaction details can comprise any information that can be associated with a transaction. For example, the transaction details can include a product or service identifier, a unique identifier associated with a specific product instance, a merchant or retail store identifier, a price, a return policy, and a product condition (e.g. new, used, refurbished, open-box, or floor model), to name a few.

At block 204, the transaction details are presented to the customer 106 associated with the mobile computing system 110 in a human-readable format. In one embodiment, presenting the transaction details to the customer 106 comprises the client transaction processor 120 translating information associated with the machine-readable code into a human-readable format.

At block 206, the client transaction processor 120 receives a verification response from the customer 106. At decision block 208, the client transaction processor 120 determines if the verification response indicates that the transaction details are accurate. In one embodiment, this may also involve determining if the verification response indicates the customer 106 desires to proceed with the transaction. If the client transaction processor 120 determines that the verification response indicates that either the transaction details are inaccurate, or the customer 106 does not wish to proceed with the transaction, the client transaction processor 120 rejects the transaction at block 210. Rejecting the transaction may comprise communicating a rejection to the merchant 108 or the point of sale system 112, and/or not initiating payment to the retail store 102.

If the verification response indicates the transaction details are accurate, the client transaction processor 120 initiates payment for the transaction at block 212. In one embodiment, initiating payment comprises contacting a third-party payment system 130 to perform the payment transaction. The payment transaction is described in further detail with respect to FIG. 4 below. Contacting the third-party payment system 130 can further comprise providing account access information, such as a user name and password, and a subset of the transaction details, such as a price and a merchant or retail store identifier, to the third-party payment system 130. In one embodiment, the client transaction processor 120 receives a third-party payment system 130 selection and account access information associated with customer 106 and the third-party payment system 130 from the customer 106. Alternatively, one or more of a third-party payment system 130 selection and account access information associated with customer 106 and the third-party payment system 130 is accessed from the payment account repository 122.

At block 214, the mobile computing device 110 accesses a machine-readable code comprising transaction details associated with a completed transaction. The transaction details can comprise any information that can be associated with a completed transaction. For example, the transaction details can include a product or service identifier, a unique identifier associated with a specific product instance, a merchant or retail store identifier, a price, a return policy, an identification of the third-party payment system 130, the date the transaction occurred, and a product condition (e.g. new, used, refurbished, open-box, or floor model), to name a few. In one embodiment, the payment account repository 122 can store the machine-readable code associated with the completed transaction. In one embodiment, the machine-readable code associated with the completed transaction can serve as a receipt. In one embodiment, the transaction details do not include a price thereby enabling the machine-readable code to serve as a gift-receipt. Alternatively, the mobile computing system can remove the price from the machine-readable code. In one embodiment, block 214 is optional.

Example Transaction Authorization Process from a Merchant Perspective

Figure 3:
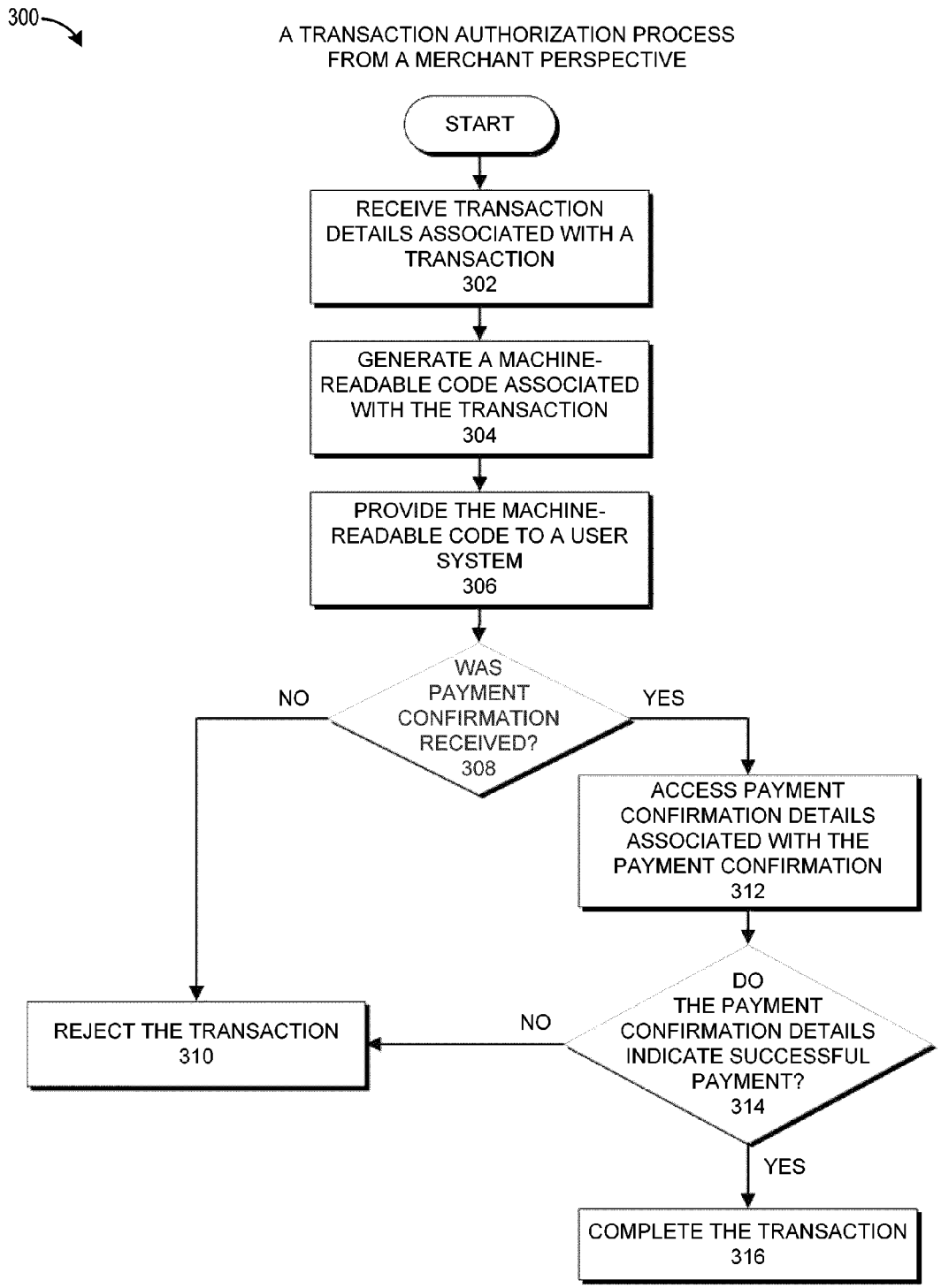
FIG. 3 illustrates a flow diagram for one embodiment of a transaction authorization process from a merchant perspective.

FIG. 3 illustrates a flow diagram for one embodiment of a transaction authorization process 300 from a merchant perspective. The process 300 can be implemented by any system that can access transaction details associated with a transaction and can generate a machine-readable code associated with the transaction details. For example, the process 300, in whole or in part, can be implemented by the point of sale system 112, the machine-readable code interface 116, or the merchant transaction processor 118, to name a few. Although any number of systems, in whole or in part, can implement the process 300, to simplify discussion, the process 300 will be described as being generally implemented by the merchant transaction processor 118.

The process 300 begins at block 302, where, for example, the merchant transaction processor 118 receives transaction details associated with a transaction. These transaction details can comprise the same types of information described above in relation to block 202. Further, these transaction details may be received from one or more sources including, for example, a machine-readable code associated with a product, transaction details stored in a data store (not shown) associated with the retail store 102, user-input from merchant 108, and an internal data store (not shown) associated with point of sale system 112.

At block 304, the merchant transaction processor 118 generates a machine-readable code associated with the transaction. This machine-readable code can comprise an encoded version of any of the transaction details obtained at block 302. At block 306, the merchant transaction processor 118 provides the machine-readable code to a user system, such as the mobile computing device 110. The merchant transaction processor 118 determines at decision block 308 whether payment confirmation was received. In one embodiment, there is a threshold period of time associated with decision block 308. If payment confirmation is not received before the threshold period of time expires, the merchant transaction processor 118 determines that the payment confirmation was not received.

If the payment confirmation is not received, the merchant transaction processor 118 rejects the transaction at block 310. Rejecting the transaction may comprise doing nothing, informing the customer 106 that the transaction is rejected, and/or informing the merchant 108 that the transaction is rejected.

If the payment confirmation is received, the merchant transaction processor 118 accesses payment confirmation details associated with the payment confirmation at block 312. These payment confirmation details can comprise any information that can be associated with a successful or unsuccessful payment transaction. For example, the payment confirmation details can indicate whether payment was made; the amount of the payment; in which account the payment was made; the identity of the third-party payment system 130; when the payment will be accessible by the retail store 102; and any surcharges for using the third-party payment system 130, to name a few.

At decision block 314, the merchant transaction processor 118 determines if the payment confirmation details indicate a successful payment. In one embodiment, the merchant transaction processor 118 automatically determines if the payment was successful by comparing one or more of the payment confirmation details with the transaction details. Alternatively, or additionally, the merchant transaction processor 118 translates the payment confirmation details into human-readable form and causes the human-readable payment confirmation details to be presented to the merchant 108 who can then confirm whether or not the payment was successful.

If the payment was not successful, the merchant transaction processor 118 rejects the transaction at block 310. If the payment was successful, the merchant transaction processor 118 completes the transaction. In one embodiment, completing the transaction may comprise indicating that the transaction was successful to the merchant 108 or to the customer 106. In one embodiment, completing the transaction may comprise storing in the transaction repository 114 one or more of the machine-readable code, the transaction details associated with the machine-readable code, the payment confirmation, and the payment confirmation details associated with the payment confirmation. In one embodiment, completing the transaction may comprise generating a receipt associated with the transaction and providing the receipt to the customer 106 and/or the mobile computing system 110. This receipt can be a traditional paper receipt, or it can be a machine-readable code printed on paper, transmitted to the mobile computing system 110, or made available to the mobile computing system 110 via an optical imaging device, such as a camera.

In one embodiment, the process 300 may also comprise determining if the payment confirmation was provided by a trusted source. This can comprise determining if a signature associated with the payment confirmation is associated with the third party system 130. In one embodiment, the payment confirmation can be encrypted. Thus, block 312 may also comprise decrypting the payment confirmation.

Example Payment Process

Figure 4:
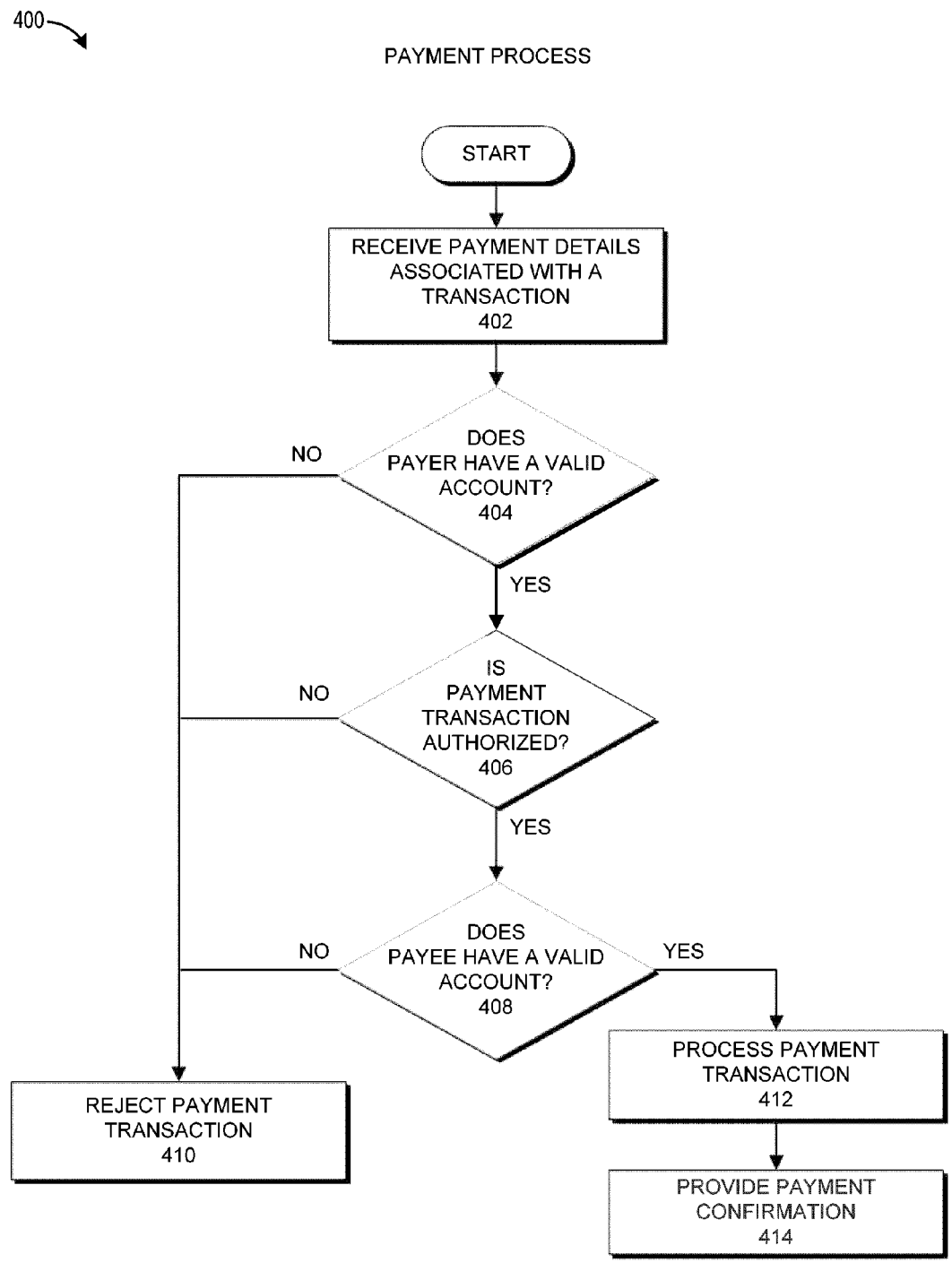
FIG. 4 illustrates a flow diagram for one embodiment of a payment process.

FIG. 4 illustrates a flow diagram for one embodiment of a payment process 400. The process 400 can be implemented by any system that can transfer payment between two accounts. For example, the process 400, in whole or in part, can be implemented by the third-party payment system 130. Advantageously, in some embodiments, the process 400 enables customer 106 to purchase a product or service at the retail store 102 using a mobile computing system 110. Further, in some embodiments, the process 400 advantageously enables the customer 106 to make a purchase without requiring any additional form of payment, such as a credit card, a debit card, or cash.

The process 400 begins at block 402, where, for example, the third-party payment system 130 receives payment details associated with a transaction from the mobile computing system 110. The payment details can include any information that facilitates transferring money or credit between an account associated with a payer, e.g. the customer 106, and an account associated with a payee, e.g. the retail store 102. For example, the payment details may include: payee account identification information; payer account identification information; a price; and payer account access information, e.g. user name and password.

At decision block 404, the third-party payment system 130 determines if the payer is associated with a valid, or existing account. In one embodiment, determining if the payer is associated with a valid account can also comprise authenticating the payer and determining that the payer is associated with the account the payer is attempting to access.

If the payer is associated with a valid account, at decision block 406, the third-party payment system 130 determines if the payment transaction is authorized. In one embodiment, determining if the payment transaction is authorized comprises determining if the payer has sufficient credit, or money, in the account to complete the transaction. In one embodiment, determining if the payment transaction is authorized may be based, for example, on one or more of the: product or service, the identity of the payer, the identity of the payee, the identity of any additional organization or user associated with the account, and any usage-rules associated with the account. For example, supposing the payer's account is also associated with a corporation (e.g. the payer's employer), the corporation may have restricted the ability to use the payer's account at particular retailers of for particular products. As a second example, a parent could give his or her child authorization to use an account, but restrict the kinds of transactions that can be completed using the account. In one embodiment, receiving the payment details at block 402 is sufficient to determine that the payment transaction is authorized at block 406. If the payment transaction is authorized, at decision block 408, the third-party payment system determines if the payee is associated with a valid or existing account. In one embodiment, determining if the payee is associated with a valid account can comprise authenticating the payee and determining if the payee is associated with the account that has been identified as the target of the payment.

If the payee is associated with a valid account, the third-party payment system 130 processes the payment transaction at block 412. Processing the payment transaction can comprise transferring money or credit from the payer's account to the payee's account. At block 414, the third-party payment system provides payment confirmation to the payee. In one embodiment, block 414 may also comprise providing payment confirmation to the payer. In one embodiment, block 414 may also comprise storing a record or log of the transaction at the user account repository 132.

If the third-party payment system 130 makes a negative determination at decision block 404, 406, or 408, the third-party payment system 130 rejects the payment transaction at block 410. Rejecting the payment transaction may also comprise providing a transaction denied response to the payer and/or the payee. In one embodiment, the transaction denied response can include the reason that the third-party payment system 130 did not complete the transaction. In one embodiment, block 410 may also comprise storing a record or log of the rejected transaction at the user account repository 132.

In one embodiment, the payer account and the payee account may be associated with different third-party payment systems. The third-party payment system 130 associated with the payer account can transfer money or credit to the third-party payment system associated with the payee account. In one embodiment, one or both of the third-party payment systems can send confirmation of payment to the customer 106 and the merchant 108.

In one embodiment, the process 400 can be used for processing a refund or payment adjustment. To process a refund or adjustment, the customer 106 is identified to the third-party payment system 130 as the payee and the retail store 102 is identified as the payer. To facilitate record keeping, and to reduce fraudulent transactions, in one embodiment, processing a refund or payment adjustment comprises receiving the identity of a previously completed transaction. The third-party payment system 130 can then compare the payment details received at block 402 with the payment details stored at the user account repository 132 during the initial payment transaction to determine if the refund or payment adjustment is associated with a valid completed transaction.

Example Refund/Adjustment Process

Figure 5:
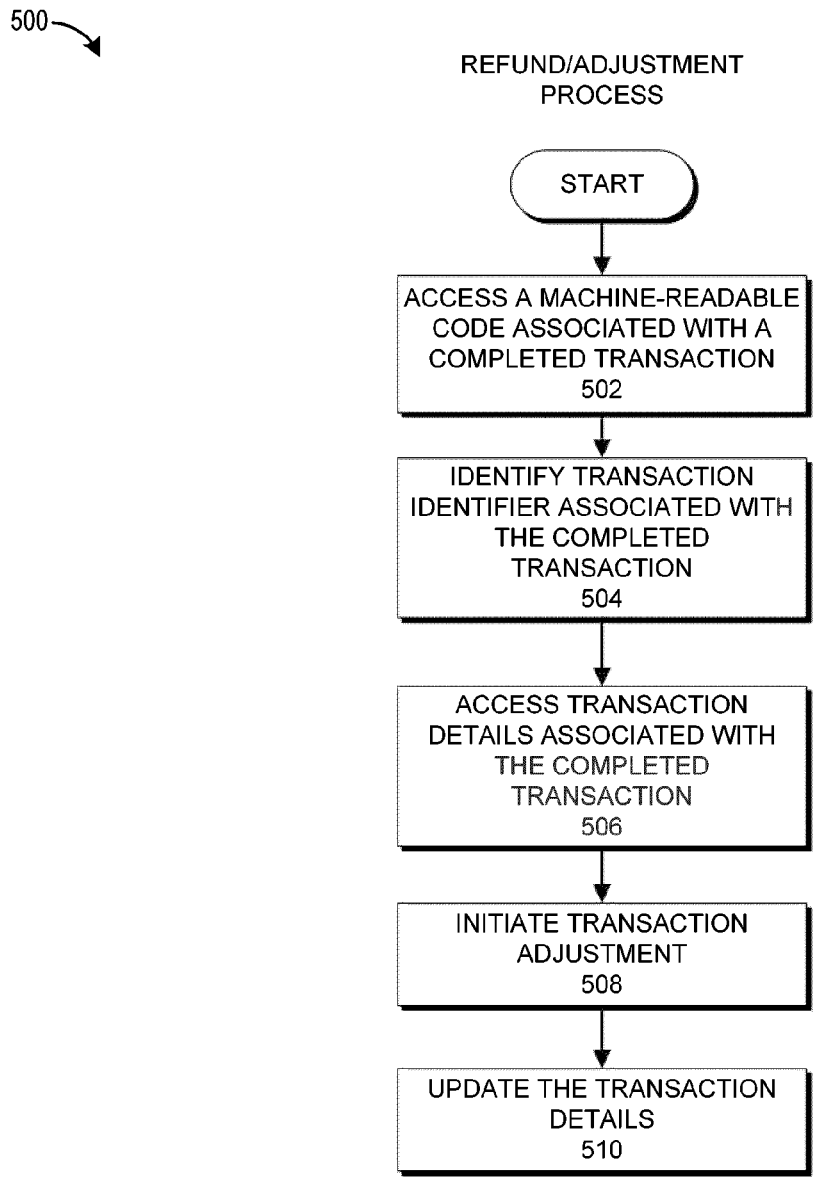
FIG. 5 illustrates a flow diagram for one embodiment of a refund/adjustment process.

FIG. 5 illustrates a flow diagram for one embodiment of a refund/adjustment process 500 from the perspective of a retail store 102. The process 500 can be implemented by any system that can access a machine-readable code and initiate a refund or price adjustment transaction. For example, the process 500, in whole or in part, can be implemented by the point of sale system 112, the machine-readable code interface 116, or the merchant transaction processor 118, to name a few. Although any number of systems, in whole or in part, can implement the process 500, to simplify discussion, the process 500 will be described as being generally implemented by the merchant transaction processor 118.

The process 500 begins at block 502, where, for example, the merchant transaction processor 118 accesses a machine-readable code associated with a completed transaction. The machine-readable code can be provided on a piece of paper, such as a receipt, or by the mobile computing device 110. At block 504, the merchant transaction processor 118 identifies a transaction identifier associated with the completed transaction and the machine-readable code.

The merchant transaction processor 118 accesses transaction details associated with the completed transaction at block 506. In one embodiment, the merchant transaction processor 118 accesses the transaction details from the transaction repository 114 using the transaction identifier. In one embodiment, transaction details can be determined from the machine-readable code.

In one embodiment, the merchant transaction processor 118 translates the transaction details into human-readable form. The human-readable transaction details can then be presented to one or more of the customer 106 and the merchant 108 to verify the transaction details.

At block 508, the merchant transaction processor 118 initiates a transaction adjustment, or refund. Block 508 can comprise identifying from the transaction details the third-party payment system 130 that performed the original transaction and contacting the third-party payment system 130 to perform the payment process 400 described above with respect to FIG. 4 using the original payer has the payee and the original payee as the payer.

At block 510, the merchant transaction processor 118 updates the transaction details stored on the transaction repository 114 to indicate the refund or price adjustment. In one embodiment, block 510 comprises generating a new machine-readable code with the updated transaction details and providing the new machine-readable code to the mobile computing system 110. In one embodiment, block 510 is optional.

Example Product Stock Renewal Transaction Environment

Figure 6:
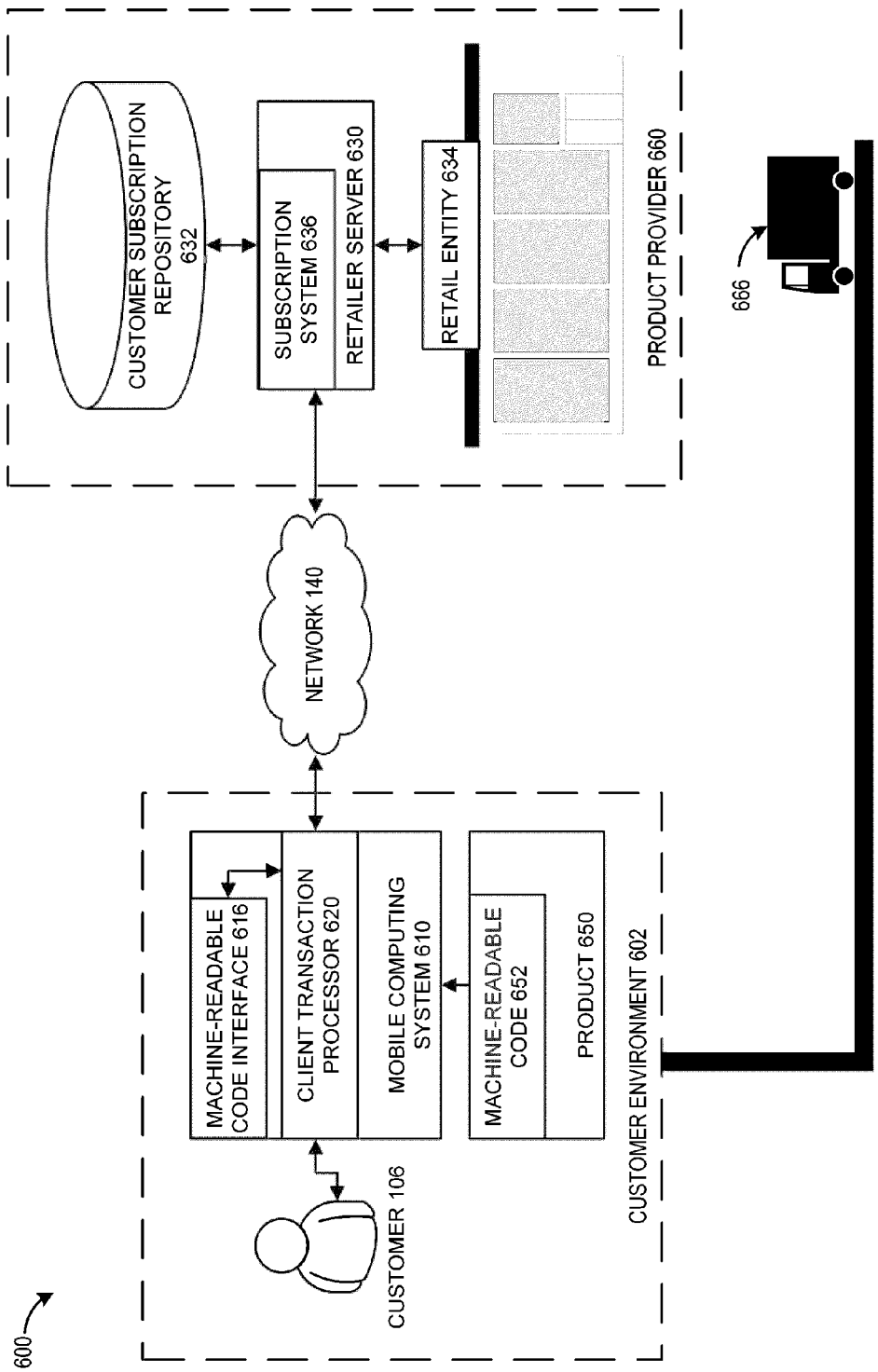
FIG. 6 illustrates an embodiment of a transaction environment that can use machine-readable codes to facilitate product stock renewal.

FIG. 6 illustrates an embodiment of a transaction environment 600 that can use machine-readable codes to facilitate product stock renewal. The transaction environment 600 includes a customer environment 602, which represents any location associated with a customer 106 who may desire to resupply a product at the location. For example, the customer environment 602 can be the customer's 106 residence, place of business, or dependent's residence, to name a few.

Generally, the customer environment 602 includes one or more products that need replacing or refilling on a regular or semi-regular basis because, for example, the product is a limited-use product or is capable of expiring. The product 650 represents one such product and can include any product that can be refilled or resupplied by a product provider 660. For example, the product 650 can be a package of paper towels, toothpaste, milk, a box of computer paper, pharmaceuticals, or pens. Further, in some embodiments, the product 650 can include services that are purchased on a regular or semi-regular basis. For example, the product 650 can include a carpet-cleaning service, a gardening service, or a catering service. The product provider 660 can include any type of retailer or service provider that can provide the product 650 to the customer 106.

The product 650 is associated with a machine-readable code 652. The machine-readable code 652 is associated with product reorder details, which can comprise any information that can facilitate reordering or restocking the product 650 including information associated with the identity of the product 650, the identity of the product provider 660, and the identity of the customer 106. The product information associated with the identity of the product 650 can comprise, for example: an identity of a product type (e.g. batteries or soap), the quantity of the product 650 to reorder (e.g. five boxes of four-count razor blades), the size or count of the product 650 (e.g. a three-pack of tissues), and the brand of the product 650, to name a few. The identity of the product provider 660 can comprise, for example: a website, a physical location, or a franchise identification, to name a few. The identity of the customer 106 can comprise, for example: an account identification, a billing address, or a shipping address, to name a few.

In one embodiment, the machine-readable code 652 is associated with a Uniform Resource Locator (URL) that is associated with a retailer website hosted by the retailer server 630. The URL can further be associated with the customer's 106 account and the product 650.

It is generally preferred that the machine-readable code 652 is placed in a location that makes it easy for the customer 106 to access the machine-readable code 652 using the mobile computing system 610. This location may differ based on the type of product or service and the customer 106. For example, the machine-readable code 652 can be affixed (as illustrated), by either the product provider 660 or the customer 106, to packaging associated with the product 650, or the last unit of the product 650 (e.g. the last ream of computer paper in a 12-count box of computer paper). As a second example, the machine-readable code 652 may be affixed to a sticker, a piece of paper, an invoice, or any other item separate from the product 650 enabling the customer 106 to place the machine-readable code 652 in a location of the customer's 106 choice, such as a kitchen cabinet or a desk drawer. In one embodiment, the machine-readable code 652 is mailed to the customer 106. Alternatively, the customer 106 can print the machine-readable code 650 from, for example, a retailer website. In one embodiment, the machine-readable code 652 can be a watermark. This watermark can be visible, invisible, or less visible than other markings on the product 650. One example of a watermark that can be incorporated in the machine-readable code 652 is the Digimarc® from Digimarc Corporation of Beaverton, Oreg.

When the customer 106 decides that it is time to reorder the product 650, the customer 106 scans or accesses the machine-readable code 652 using the mobile computing system 610. The mobile computing system 610 can comprise any type of mobile computing system, such as the mobile computing system 110. The mobile computing system 610 can include a machine-readable code interface 616 and a client transaction processor 620. The machine-readable code interface 616 can generally include any system capable of reading or scanning the machine-readable code 652. In one embodiment, the machine-readable code interface 616 can comprise the machine-readable code interface 116.

The client transaction processor 620 can comprise any system capable of initiating a reorder transaction associated with the product 650 based on the machine-readable code 652. In one embodiment, the client transaction processor 620 can translate the product reorder details associated with the machine-readable code 652 into a human-readable form and cause the human-readable product reorder details to be presented to the customer 106. In one embodiment, the client transaction processor 620 can comprise the client transaction processor 120.

Initiating the reorder transaction can comprise, for example, the mobile computing system 610 communicating with a retailer website hosted by the retailer server 630 via the network 140. The retailer server 630 can comprise any computing system that enables the customer 106 to place an order for the product 650 with the product provider 660. In one embodiment, the retailer server 630 enables the customer 106 to define a subscription for the product 650 using subscription system 636. Defining the subscription can comprise the customer 106 providing the product provider 660 with product information and customer identity information, such as billing, shipping, and account information. The subscription can then be stored in the customer subscription repository 632 enabling the product provider 660 to determine product reorder details not provided by the mobile computing system 610 or to confirm product reorder details that were provided by the mobile computing system 610.

In one embodiment, the subscription system 636 is configured to automatically replenish the supply of the product 650. In one embodiment, by accessing the machine-readable code 652, the customer 106 can cause the product 650 to be reordered prior to the time specified in the subscription for reordering the product 650. Accelerating when the product 650 is reordered can be advantageous in cases when the supply of the product 650 is exhausted sooner than anticipated.

The product provider 660 also includes a retail entity 634. The retail entity 634 can comprise any physical location associated with the product provider 660. For example, the retail entity 634 can be a brick-and-mortar store or a product warehouse. Once the customer 106 completes the reorder transaction, the product provider 660 can cause the retail entity 634 to ship the product 650 from the retail entity 634 to the customer environment 602 via shipping provider 666.

Example Periodic Reorder Process

Figure 7:
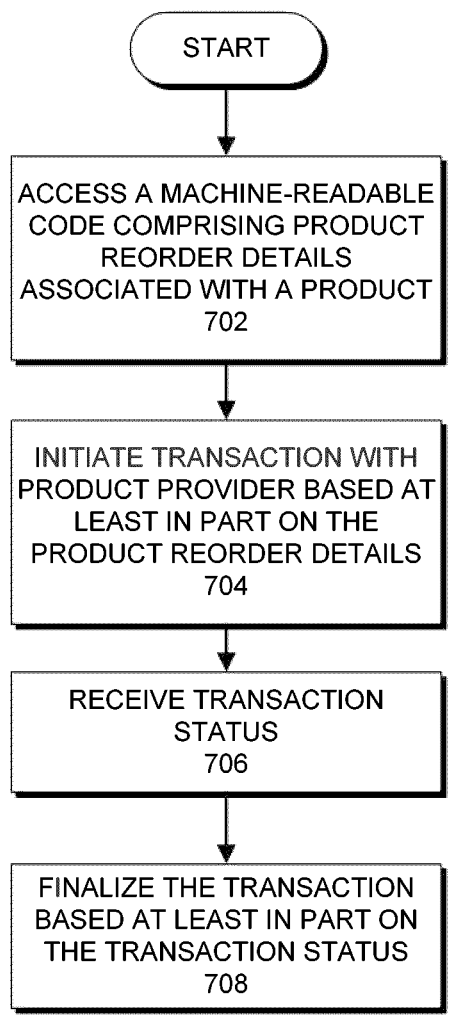
FIG. 7 illustrates a flow diagram for one embodiment of a periodic reorder process.

FIG. 7 illustrates a flow diagram for one embodiment of a periodic reorder process 700. The process 700 can be implemented by any system that can access a machine-readable code and initiate a product reorder or restocking transaction. For example, the process 700, in whole or in part, can be implemented by the mobile computing system 610, the machine-readable code interface 616, or the client transaction processor 620, to name a few. Although any number of systems, in whole or in part, can implement the process 700, to simplify discussion, the process 700 will be described as being generally implemented by the client transaction processor 620. In one embodiment, the process 700 can be used to reorder a service, such as a house-cleaning service.

The process 700 begins at block 702, where, for example, the client transaction processor 620 accesses a machine-readable code 652 comprising product reorder details associated with the product 650. In one embodiment, the client transaction processor 620 translates the product reorder details into human-readable code and causes the human-readable product reorder details to be presented to the customer 106. In one embodiment, the client transaction processor 620 waits for confirmation from the customer 106 before proceeding.

At block 704, the client transaction processor 620 initiates a transaction with, for example, the product provider 660 based at least in part on the product reorder details. In one embodiment, additional product reorder details are associated with the customer's 106 account with the product provider 660. In one embodiment, the transaction is based at least in part on the additional product reorder details. For example, the machine-readable code 652 may comprise product reorder details that include the identity of the product 650 and the identity of the customer's 106 account. Continuing the example, the additional product reorder details stored with the product provider 660 may comprise billing and shipping information for the customer 106.

In one embodiment, the client transaction processor 620 can determine if the machine-readable code 652 has been accessed within a threshold period of time, or a threshold number of times within a threshold period of time. If so, the client transaction processor 620 can reject an attempt to initiate a transaction with the product provider 660. Alternatively, the client transaction processor 620 can cause a warning or informational message to be presented to the customer 106 associated with the satisfied or exceeded threshold. In one embodiment, the client transaction processor 620 can request confirmation of whether to initiate the transaction.

At block 706, the client transaction processor 620 receives a transaction status. The transaction status can indicate whether the transaction was confirmed, rejected, or requires further input (e.g. a confirmation from the customer 106) to complete the transaction. In one embodiment, the transaction status may comprise an alternative product suggestion, a suggested quantity change, or a suggested brand change. In one embodiment, the block 706 is optional.

The transaction is finalized at block 708 based at least in part on the transaction status. Finalizing the transaction may comprise receiving a confirmation from the customer 106 to proceed with the transaction, directing the product provider 660 to complete the transaction, or directing the product provider 660 to modify the transaction based at least in part on the transaction status. In one embodiment, block 708 is optional.

In one embodiment, accessing the machine-readable code at block 702 is sufficient to cause the product provider 660 to ship the replacement or reordered product 650 and/or to complete the transaction without any further action or participation from the customer 106. Thus, merely scanning the machine-readable code can cause the purchase to take place, thereby providing a convenient and fast reordering process for a user. In one embodiment, the customer 106 can modify or cancel the transaction after the client transaction processor 620 accesses the machine-readable code 652. For example, the retailer may send an email with cancellation options to the user in response to the machine-readable code being scanned. The cancellation options may include a time limit, such as a day or the like, for cancelling the order. Sending such an email can reduce the potential for accidental or fraudulent transactions from being completed.

In one embodiment, process 700 can be used to refill a pharmaceutical prescription. In one embodiment, the client transaction processor 620 can track consumption of the pharmaceutical and can cause a reminder to be provided to the customer 106 when it is time to reorder the pharmaceutical. Advantageously, the reminder can be provided in advance of the customer 106 exhausting the pharmaceutical prescription thereby enabling the customer 106 to refill or renew the prescription prior to exhausting the customer's 106 current pharmaceutical supply. Further, the client transaction processor can cause a reminder to be provided to the customer 106 when it is time to take a dose of the prescription.

Example Periodic Reorder Fulfillment Process

Figure 8:
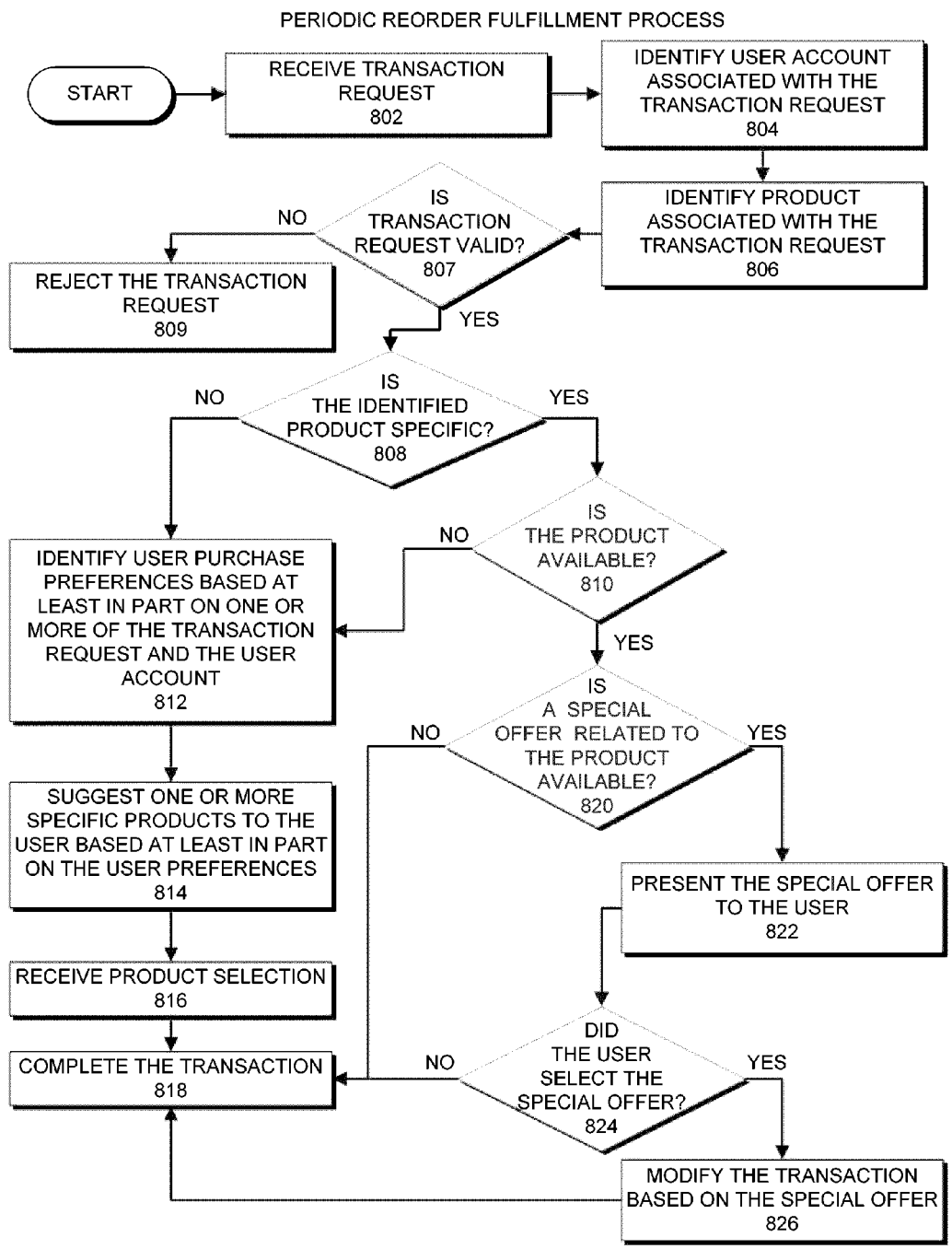
FIG. 8 illustrates a flow diagram for one embodiment of a periodic reorder fulfillment process.

FIG. 8 illustrates a flow diagram for one embodiment of a periodic reorder fulfillment process 800. The process 800 can be implemented by any system that can process a product reorder request. For example, the process 800, in whole or in part, can be implemented by the product provider 660, the retailer server 630, or the subscription system 636, to name a few. Although any number of systems, in whole or in part, can implement the process 800, to simplify discussion, the process 800 will be described as being generally implemented by the subscription system 636. In one embodiment, the process 800 can be used to process a service reorder request, such as a request for a carpet-cleaning service.

The process 800 begins at block 802, where, for example, the subscription system 636 receives a transaction request from, for example, the client transaction processor 620 associated with the customer 106. The transaction request is associated with a product reorder request. At block 804, the subscription system 636 identifies a user account associated with the transaction request. In one embodiment, the user account is stored on the customer subscription repository 632.

The subscription system 636 identifies a product associated with the transaction request at block 806. In one embodiment, the transaction request identifies the product. Alternatively, the product is identified from the user account.

At decision block 807, the subscription system 636 determines if the transaction request is valid. This can involve any predefined validity checks specified by the customer 106 or by an administrator of the subscription system 636. In one embodiment, determining if the transaction is valid can involve determining if the subscription system 636 received a substantially similar or identical transaction request within a threshold period of time. If so, the subscription system 636 can ignore or reject the transaction request at block 809. Alternatively, the subscription system 636 can proceed with the transaction request and can optionally inform the customer 106 of the potentially duplicate transaction request and request confirmation. Advantageously, this temporal check can prevent the customer 106 from accidentally placing a duplicate order. In one embodiment, block 807 is optional.

At decision block 808, the subscription system 636 determines if the identified product is a specific product or is associated with a group of products. This granularity determination can be based on any criteria that may be associated with one or more products, such as product brand, product type, or product quantity, to name a few. If the identified product is specific, at decision block 810, the subscription system 636 determines if the product is available. Decision block 810 can comprise determining if the product is currently available, or if the product is anticipated to be available within a threshold period of time.

If it is determined at decision block 808 that the identified product is not specific, or if it is determined at decision block 810 that the identified product is not available, the subscription system 636 identifies user purchase preferences based at least in part on one or more of the transaction request and the user account at block 812. The user purchase preferences can comprise any user specified criteria for identifying suggested products to fill a product reorder request. For example, the user purchase preferences can be associated with price criteria, quantity criteria, customer review scores, related purchases (e.g. only suggest razor blades compatible with a previously purchased razor), brand preferences, country of origin preferences, or current product availability, to name a few. In one embodiment, the subscription system 636 can associate default preferences with the customer 106.

At block 814, the subscription system 636 can suggest one or more specific products to the customer 106 based at least in part on the user preferences. In one embodiment, suggesting one or more products can include presenting special offers to the customer 106. In one embodiment, suggesting one or more products can include suggesting products that the customer 106 previously ordered in place of the currently requested product. In one embodiment, if the customer 106 has specified dissatisfaction, such as through a negative customer rating, with a previously ordered product, the subscription system 636 can remove the previously ordered product from a list of potential products to suggest to the customer 106.

At block 816, the subscription system 636 receives a product selection. The selected product can be the suggested product, or an alternative product identified by the customer 106. In one embodiment, the customer 106 can specify whether to update the customer's 106 account to replace the product identified at block 806 with the currently selected product for future product reorder requests.

The transaction is completed at block 818. Completing the transaction can comprise billing customer 106, initiating shipment of the product to customer 106, and generating a machine-readable code to provide to the customer 106 for future product reorder purchases. In one embodiment, completing the transaction can comprise confirming with the customer 106 whether to complete the order.

If it is determined at decision block 810 that the identified product is available, the subscription system 636 determines at decision block 820 if a special offer related to the product is available. If not, the subscription system 636 completes the transaction at block 818. If a special offer is available, the subscription service 636 can cause the special offer to be presented to the customer 106 at block 822. The special offer can be based on any factor. For example, the special offer can be based on user preferences, past orders, or current product stock, to name a few. In one embodiment, the special offer can be associated with an alternative product. For example, if the product identified at block 806 is a brand X battery, the special offer could relate to a brand Y battery.

At decision block 824, the subscription system 636 determines if the customer 106 selected the special offer. If not, the subscription system 636 completes the transaction at block 818 based on the original transaction request. If the customer 106 did select the special offer, the subscription system 636 modifies the transaction based on the special offer at block 826. At block 818, the subscription system 636 completes the transaction based on the modified transaction. In one embodiment, if the special offer is associated with an alternative product selection, the customer 106 can specify whether to update the customer's 106 account to replace the product identified at block 806 with the currently selected product for future product reorder requests.

In one embodiment, the subscription system 636 can complete the transaction associated with the transaction request received at block 802 without any further interaction with the customer 106. In one embodiment, the subscription system 636 can wait a predefined period of time before completing the transaction thereby giving the customer 106 time to modify or cancel the requested transaction.

In one embodiment, the transaction request comprises an identifier associated with predefined transaction details stored at the customer subscription repository 632. Upon receiving the identifier, the subscription system 636 can identity the predefined transaction details from the customer subscription repository and process the transaction without further interaction with the customer 106. Alternatively, the subscription system 636 can notify the customer 106 of the pending transaction and wait for confirmation. In one embodiment, the subscription system 636 can complete the transaction after a threshold period of time if no confirmation is received from the customer 106.

In one embodiment, the subscription system 636 can provide one or more substitute products for the product identified at block 806. The identity of the one or more substitute products can be predefined or pre-associated with the user account or the product. Alternatively, the one or more substitute products can be determined at the time of shipping based on product availability.

Example Gift Redemption Transaction Environment

Figure 9:
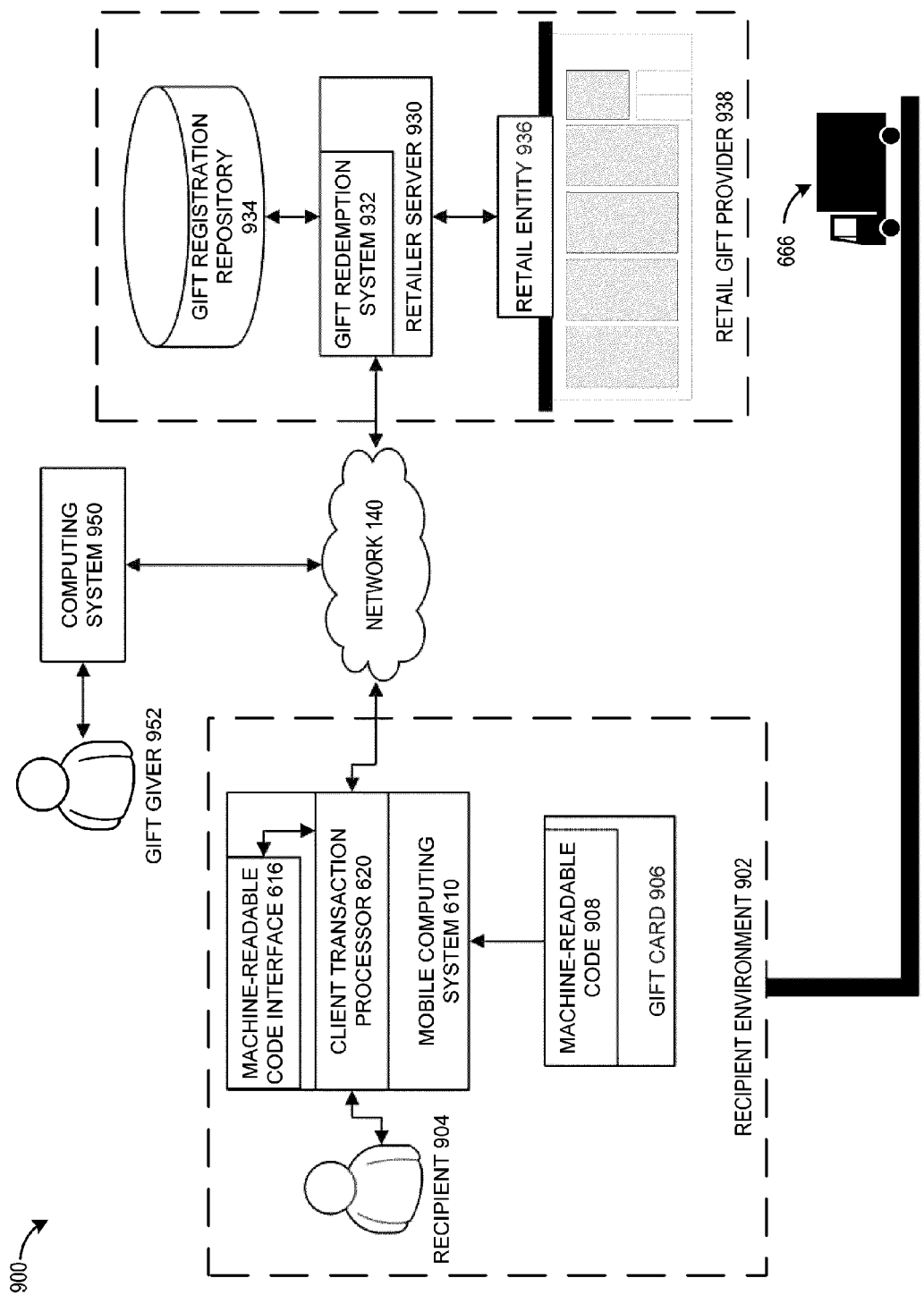
FIG. 9 illustrates an embodiment of a transaction environment that can use machine-readable codes to facilitate gift redemption.

FIG. 9 illustrates an embodiment of a transaction environment 900 that can use machine-readable codes to facilitate gift redemption. The transaction environment 900 includes a recipient environment 902, which represents any location associated with a gift card recipient 904 who has received a gift card from a gift giver 952. There is no limitation to the recipient's 904 physical location. For example, the recipient environment 902 can be the recipient's 904 residence, place of business, car, or a park where the recipient 904 is currently having a picnic. Regardless of location, the recipient environment 902 includes a mobile computing system 610 and a gift card 906.

The gift card 906 can be any type of gift card that is provided in any manner to the recipient 904 and that includes a machine-readable code 908. For example, the gift card can be provided to the recipient 904 by mail, email, text message, Facebook message or post, or handed to the recipient 904. Further, the gift card can be a physical card, an electronic or digital card, or a piece of paper printed by the recipient 904 or any other party before it is provided to the recipient 904. Additionally, the gift card 906 can be associated with any product or service. For example, the gift card 906 can be associated with a book, movie, toy, clothing, credit at one or more retailers, charity donation to one or more charity organizations, salon or spa service, or house painting service, to name a few.

The machine-readable code 908 comprises transaction details associated with a predefined transaction (e.g. a gift transaction). These transaction details can include any information that can facilitate the gift giver 952 providing a gift to the recipient 904. Further, the transaction details can include any information that facilitates the retail gift provider 938 providing the gift to recipient 904 on behalf of the gift giver 952. For example, the transaction details can include: the recipient's 904 identity; the gift giver's 952 identity; an address associated with the recipient 904; an address associated with the gift giver 952; the identity of the gift associated with the gift card 906; restrictions, if any, on recipient 904 modifying the gift giver's 952 gift selection; the identity of a third-party receiving the gift in the recipient's 904 name (e.g. a charity receiving a monetary or gift donation in the recipient's 904 name); and any gift acceptance restrictions, processes, or guidelines (e.g. gift must be accepted within one week, gift selection must be confirmed, or a book gift cannot be substituted with a video game gift); to name a few.

The machine-readable interface 616 associated with the mobile computing system 610 is generally capable of reading or scanning the machine-readable code 908. Further, the client transaction processor 620 associated with the mobile computing system 610 is generally capable of translating the transaction details into human-readable form and causing the transaction details to be presented to the recipient 904. In addition, the client transaction processor 620 is generally capable of communicating with the retailer server 630 via the network 140 to facilitate completing the gift transaction between the gift giver 952 and the recipient 904.

Using the mobile computing system 610, the recipient 904 can scan the machine-readable code 908 included with the gift card 906. In some embodiments, scanning the machine-readable code 908 is sufficient to accept gift giver's 952 gift. In some embodiments, the recipient 904 uses the mobile computing system 610 to confirm acceptance of the gift with the retail gift provider 938, or to confirm at least some of the transaction details associated with the machine-readable code 908 and/or the gift card 906 with the retail gift provider 938.

The retail gift provider 938 can comprise any product or service provider that can complete the gift transaction between the gift giver 952 and the recipient 904 by providing the gift or service to the recipient 904. Further, in some embodiments, the retail gift provider 938 creates and/or provides the gift card 906 to the recipient 904 on behalf of the gift giver 952. The retail gift provider 938 can include a retailer server 930, a gift registration repository 934, and a retail entity 936.

The retailer server 930 can comprise any computing system that enables the gift giver 952 to cause the retail gift provider 938 to provide the recipient 904 with the gift card 906. To facilitate this process, the gift giver 952 can provide at least some of the transaction details associated with the gift card 906 to the retailer server 930. In one embodiment, the retailer server 930 hosts a website that enables the gift giver 952 to interact with the retailer server 930. In one embodiment, the retailer server 930 can store on the gift registration repository 934 transaction details associated with the gift card 906. The retailer server 930 can then access the transaction details from the gift registration repository to confirm the predefined transaction, to modify the predefined transaction, or to determine if the predefined transaction has been accepted or completed.

In one embodiment, the retailer server 930 includes a gift redemption system 932. The gift redemption system 932 can include any system for facilitating the recipient 904 redeeming the gift associated with the gift card 906. In one embodiment, the gift redemption system 932 can be a distinct computing system from the retailer server 930.

In one embodiment, when the recipient 904 scans the machine-readable code 908 with the mobile computing system 610, the mobile computing system 610 interacts with the gift redemption system 932. The gift redemption system 932 can cause the retail gift provider 938 to provide the gift associated with the gift card 906 to the recipient via, for example, shipping provider 666, email, or through a webpage, which may or may not be hosted by the retailer server 930. In one embodiment, the gift is provided to the recipient 904 by the retail entity 936. The retail entity 936 can comprise any physical location associated with the retail gift provider 938. For example, the retail entity 936 can be a brick-and-mortar store or a product warehouse. Once the recipient 904 completes the predefined transaction (e.g. accepts the gift), the retail gift provider 938 can cause the retail entity 936 to ship the product associated with the gift card from the retail entity 936 to the recipient environment 902 via shipping provider 666.

In one embodiment, the gift giver 952 defines the gift transaction by using the computing system 950 to access the retailer server 930. The gift giver 952 can identify the product, the recipient 904, and any restrictions on the redemption or modification of the gift transaction by the recipient 904. In some embodiments, the gift giver 952 can use transaction details associated with previous transactions associated with the recipient 904 and the retail gift provider 938 to facilitate gift selection.

In one embodiment, the recipient 904 can accept a gift, or complete a gift transaction, without having an account with the retail gift provider 938.

Example Gift Acceptance Process

Figure 10:
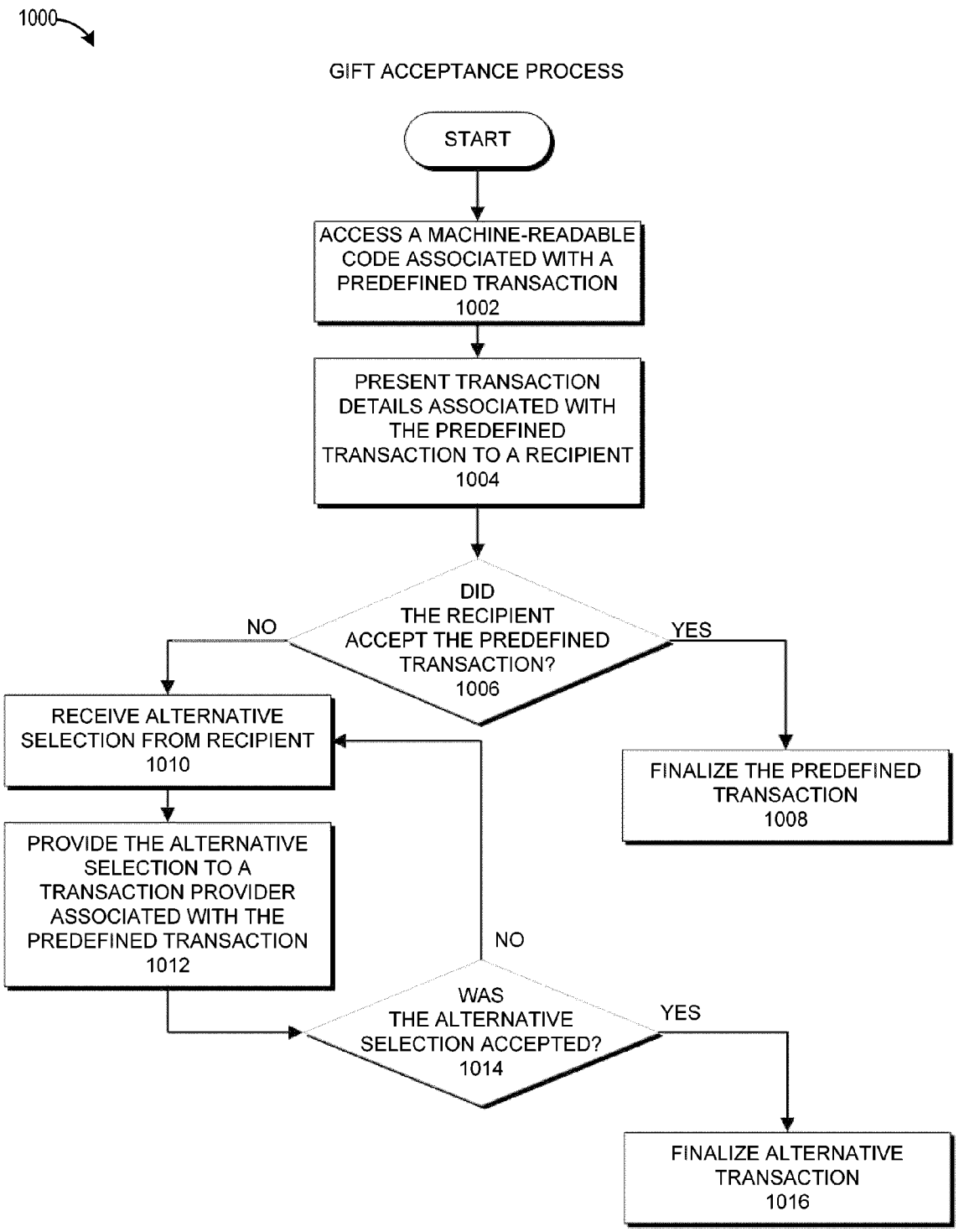
FIG. 10 illustrates a flow diagram for one embodiment of a gift acceptance process.

FIG. 10 illustrates a flow diagram for one embodiment of a gift acceptance process 1000. The process 1000 can be implemented by any system that can access a machine-readable code 908 and can complete a predefined transaction. For example, the process 1000, in whole or in part, can be implemented by the mobile computing system 610, the machine-readable code interface 616, or the client transaction processor 620, to name a few. Although any number of systems, in whole or in part, can implement the process 1000, to simplify discussion, the process 1000 will be described as being generally implemented by the client transaction processor 620.

The process 1000 begins at block 1002, where, for example, the client transaction processor 620 accesses a machine-readable code 908 associated with a predefined transaction. Although not limited as such, the predefined transaction can comprise a gift purchased by the gift giver 952 for the recipient 904. In one embodiment, the recipient 904 scans the machine-readable code 908 with the machine-readable code interface 616.

At block 1004, the client transaction processor 620 causes transaction details associated with the predefined transaction to be presented to the recipient 904. The transaction details can be accessed from one or more of the machine-readable code and the retail gift provider 938. Causing the transaction details to be presented to the recipient 904 can comprise translating the transaction details into a human-readable form and causing the human-readable transaction details to be presented to the recipient 904. In one embodiment, at least some of the transaction details are specified on the gift card 906 enabling the recipient 904 to read these transaction details without scanning the machine-readable code 908. In one embodiment, block 1004 is optional.

At decision block 1006, the client transaction processor 620 determines if the recipient 904 accepted the predefined transaction. In one embodiment, to indicate acceptance, the recipient 904 could rescan the machine-readable code 908 or select a predefined transaction acceptance option on a Graphical User Interface (GUI) presented by the mobile computing system 610. In one embodiment, accessing the machine-readable code 908 at block 1002 indicates acceptance of the predefined transaction. In one embodiment, failure to rescan the machine-readable code 908 can indicate that the recipient 904 did not accept the predefined transaction. In one embodiment, identification of an alternative product or service can indicate that the recipient 904 did not accept the predefined transaction. In one embodiment, decision block 1006 can be performed by one or more systems associate with the retail gift provider 938.

If the recipient 904 accepted the predefined transaction, the client transaction processor 620 finalizes the predefined transaction at block 1008. In one embodiment, finalizing the predefined transaction can comprise communicating the recipient's 904 acceptance of the predefined transaction to the retail gift provider 938. In one embodiment, finalizing the predefined transaction can comprise confirming shipping details, such as the recipient's 904 address. In one embodiment, block 1008 can also comprise sending a thank you note, card, email, or gift to the gift giver 952. In one embodiment, finalizing the predefined transaction can comprise specifying alternate shipping information, which may include an alternative shipping method and/or shipping address.

In one embodiment, if the recipient 904 has an account associated with the retail gift provider 938, the client transaction processor 620 can cause the retail provider 938 to associate at least some of the transaction details with the recipient's 904 account by, for example, storing the transaction details on the gift registration repository 934. In one embodiment, associating the transaction details with the recipient's 904 account advantageously enables the recipient 904 to review past gifts when deciding what to purchase for the gift giver 952 during a future gift giving occasion. Further, in some embodiments, if a second gift giver (not shown) attempts to purchase the same gift for the recipient 904, the retail gift provider can inform the second gift giver of this fact.

If the recipient 904 did not accept the predefined transaction, the client transaction processor 620 can receive an alternative selection from the recipient 904 at block 1010. The alternative selection can include any proposed modification to the predefined transaction. For example, the alternative selection can comprise a different product or service, a change in recipient (e.g. send the gift to a charity or identify a different charity to receive a donation), a change in product color, a change in product size, a change in product version, or refusal to accept the predefined transaction, to name a few. Further, the alternative selection can be the selection of cash or credit with the retail gift provider 938.

At block 1012, the client transaction processor 620 provides the alternative selection to a transaction provider (e.g. the retail gift provider 938) associated with the predefined transaction. At decision block 1014, the client transaction processor 620 determines if the alternative selection was accepted. This determination can be based on a response provided by the transaction provider. In one embodiment, whether the alternative selection was accepted can be based on any factor. For example, these factors can include the cost of the alternative selection compared to the predefined transaction, a set of predefined limitations specified by the gift giver 952, or the availability of the alternative selection, to name a few. Further, the set of predefined limitations can include any set of rules. For example, the set of rules can include: a monetary maximum; a limit on alternative recipients (e.g. the recipient 904 can only choose certain charities); and a limit on alternative selection product types (e.g. no video games or no alcohol); to name a few.

If it is determined that the alternative selection was accepted, the client transaction provider 620 finalizes the alternative transaction at block 1016. Finalizing the alternative transaction can comprise confirming acceptance of the alternative transaction; confirming an address associated with the recipient 904 or, if applicable, an alternative recipient; and sending a thank you note, card, email, or gift to the gift giver 952. In one embodiment, finalizing the alternative transaction can comprise specifying alternative shipping information, such as an alternative shipping method and/or shipping address.

Example Gift Transaction Completion Process

Figure 11:
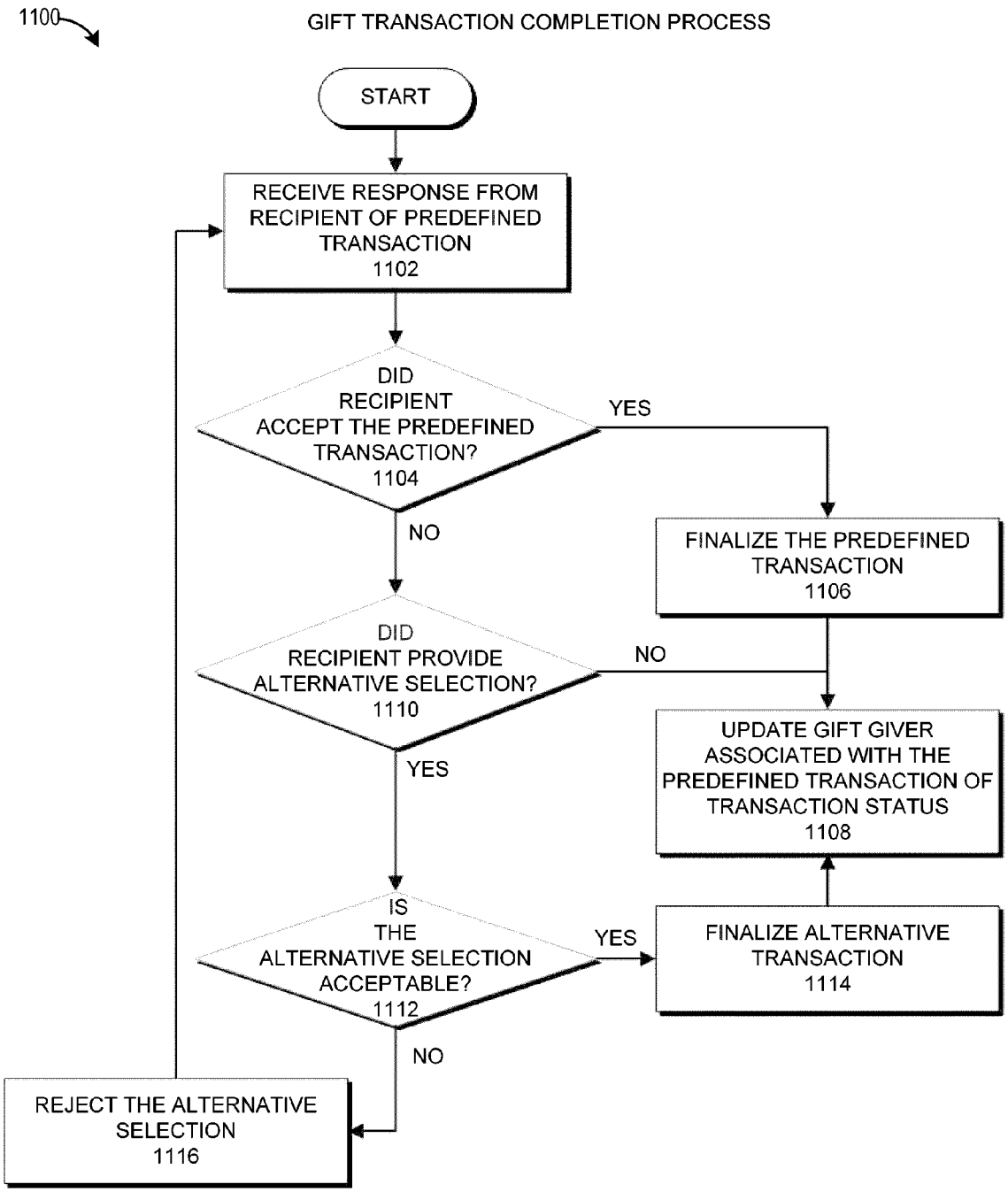
FIG. 11 illustrates a flow diagram for one embodiment of a gift transaction completion process.

FIG. 11 illustrates a flow diagram for one embodiment of a gift transaction completion process 1100. The process 1100 can be implemented by any system that can facilitate a gift transaction process on behalf of a product or service provider. For example, the process 1100, in whole or in part, can be implemented by the retail gift provider 938, the retailer server 930, or the gift redemption system 932, to name a few. Although any number of systems, in whole or in part, can implement the process 1100, to simplify discussion, the process 1100 will be described as being generally implemented by the gift redemption system 932.

The process 1100 begins at block 1102, where, for example, the gift redemption system 932 receives a response from the recipient 904 of a predefined transaction. In one embodiment, the response is received from the client transaction processor 620 in response to the machine-readable code 908 being scanned by the machine-readable code interface 616. The predefined transaction can comprise a gift purchased by the gift giver 952 for the recipient 904. At decision block 1104, the gift redemption system 932 determines if the recipient 904 accepted the predefined transaction. If so, the gift redemption system 932 finalizes the predefined transaction at block 1106. Finalizing the predefined transaction can comprise confirming an address (e.g. shipping address) associated with the recipient 904. Further, finalizing the predefined transaction can comprise storing acceptance of the predefined transaction and/or transaction details associated with the predefined transaction at the gift registration repository 934. Storing the acceptance and/or the transaction details facilitates providing product recommendations, preventing duplicate acceptances of the predefined transaction, and preventing duplicate gifts being sent to the recipient 904.

At block 1108, the gift redemption system 932 updates the gift giver 952 associated with the predefined transaction of the transaction status. This may comprise sending the gift giver 952 an email, a text message, or updating a transaction status entry associated with the gift giver's 952 account with the retail gift provider 938. Further, the transaction status can specify any status information associated with the predefined transaction. For example, the transaction status can indicate that the predefined transaction was completed successfully (i.e. the recipient 904 accepted and received the associated gift); that the predefined transaction was modified; that the predefined transaction was actively rejected (i.e. the recipient 904 indicated a desire to reject the predefined transaction); or that the predefined transaction was passively rejected (i.e. the recipient 904 did not accept the predefined transaction within a threshold period of time); to name a few. In one embodiment, the block 1108 is optional.

If the gift redemption system 932 determines at block 1104 that the response indicates that the recipient 904 rejected the predefined transaction, the gift redemption system 932 determines if the recipient 904 provided an alternative selection at decision block 1110. The alternative selection, as described with respect to block 1010 above, can include any proposed modification to the predefined transaction. If the recipient 904 did not provide an alternative selection, the gift redemption system 932 optionally performs block 1108 indicating that the predefined transaction was rejected.

If the recipient 904 did provide an alternative selection, the gift redemption system 932 determines if the alternative selection is acceptable at determination block 1112. The determination of whether the alternative selection is acceptable can be based on, for example, pre-specified criteria defined by the gift giver 952; the price of the product or service associated with the predefined transaction; and the availability of the alternative selection (e.g. in stock, on reorder, out of production, etc.); to name a few. The pre-specified criteria can be associated with a price, a recipient, a product or service type, or any other factor that can limit the alternative selection. In one embodiment, the gift redemption system 932 can pre-filter the products presented to the gift recipient 906 based on the pre-specified criteria or any other factor relating to whether the alternative selection is acceptable. In some embodiments, this pre-filtering of presented products advantageously increases the probability that the alternative selection will be acceptable compared to a non-filtered selection.

If the alternative selection is acceptable, the gift redemption system 932 finalizes the alternative transaction at block 1114. Finalizing the alternative transaction can comprise substantially similar operations as described with respect to block 1106, but substituting the alternative selection for one or more of the product, service, or recipient associated with the predefined transaction. Further, if the alternative selection is acceptable, the gift redemption system 932 updates the gift giver 952 associated with the predefined transaction of the transaction status at block 1108. In one embodiment, block 1108 includes informing the gift giver 952 of the alternative selection.

If the alternative selection is not acceptable, the gift redemption system 932 rejects the alternative selection at block 1116. Rejecting the alternative selection can include informing the gift recipient 906 that the alternative selection is not acceptable. Further, informing the gift recipient 906 that the alternative selection is not acceptable can include informing the gift recipient 906 of why the alternative selection is not acceptable.

Example ATM Transaction Environment

Figure 12:
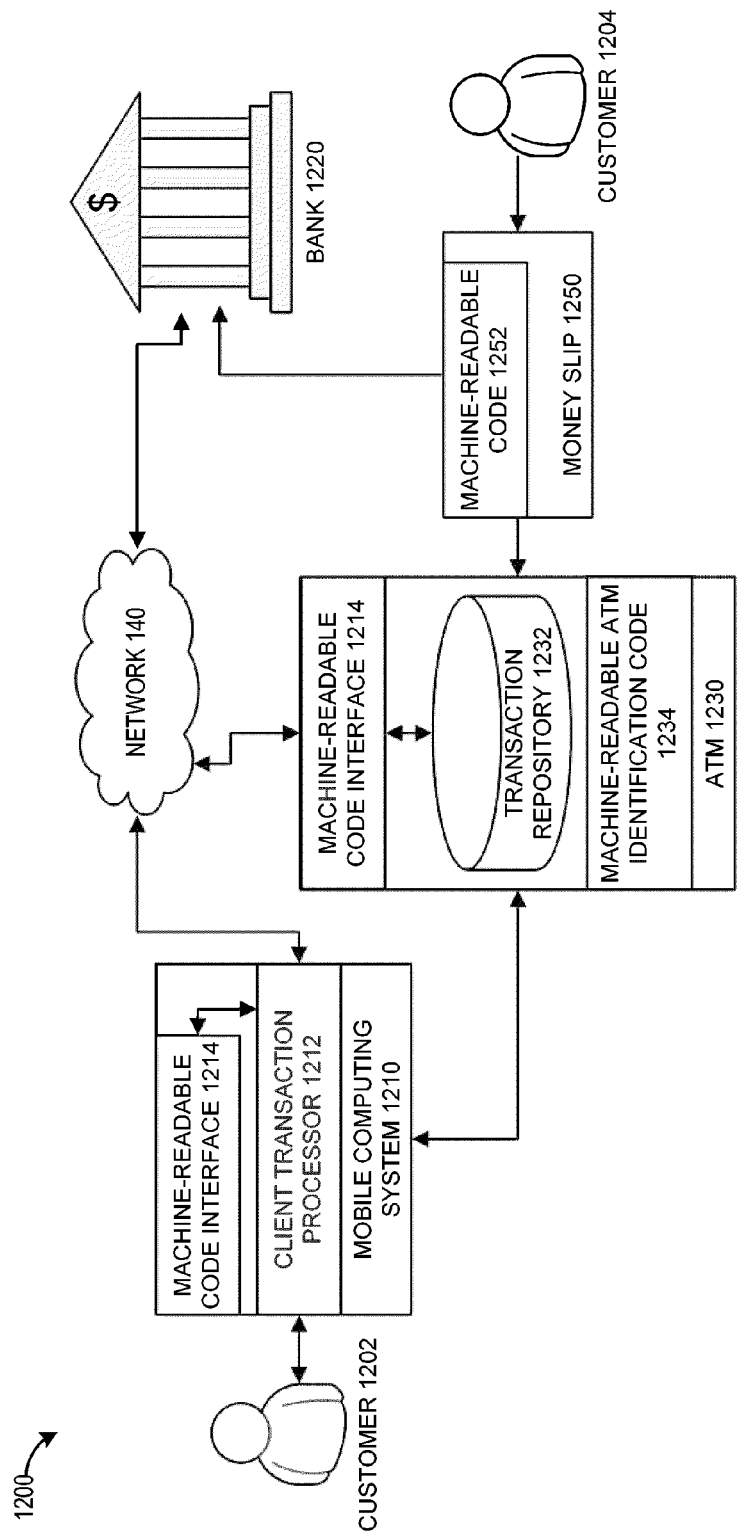
FIG. 12 illustrates an embodiment of an ATM transaction environment that can use machine-readable codes to facilitate an ATM transaction.

FIG. 12 illustrates an embodiment of an ATM transaction environment 1200 that can use machine-readable codes to facilitate an ATM transaction. In one embodiment, a customer 1202 is associated with a mobile computing system 1210. The mobile computing system 1210 can generally include any type of mobile computing system including those described in relation to the mobile computing system 110 and the mobile computing system 610. Further, the mobile computing system 1210 includes a client transaction processor 1212 and a machine-readable code interface 1214.

Like the machine-readable code interface 116, the machine-readable code interface 1214 can include any system configured to read or scan a machine-readable code.

The client transaction processor 1212 can include any system capable of communicating with the bank 1220 via network 140 to obtain a machine-readable code associated with an ATM command or ATM request. In one embodiment, the client transaction processor 1212 can translate transaction details associated with the machine-readable code into a human-readable form and cause the human-readable transaction details to be presented to the customer 1202. In one embodiment, the transaction details associated with the machine-readable code are encrypted. In some embodiments, for security purposes, the client transaction processor 1212 is not capable of decrypting the transaction details. Alternatively, in some embodiments, for transaction verification purposes, the client transaction processor 1212 is capable of decrypting the transaction details. In one embodiment, the client transaction processor 1212 can comprise the client transaction processor 620 and/or the client transaction processor 120.

In one embodiment, the customer 1202 accesses the customer's 1202 account with the bank 1220 using the client transaction processor 1212. The customer 1202 can specify an ATM transaction command or ATM transaction request associated with the customer's 1202 account to perform on the ATM 1230. In response, the client transaction processor 1212 receives from the bank 1220 a machine-readable code associated with the ATM transaction request and the customer's 1202 account with the bank 1220. The customer 1202 can then present to the ATM 1230 the machine-readable code using the machine-readable code interface 1214.

The bank 1220 can generally include any type of organization that can hold money or credit for the customer 1202, or advance money or credit to the customer 1202. Further, the bank 1220 can be a brick-and-mortar based organization, an Internet-based organization, or a combination.

The ATM 1230 can generally include any system for dispensing money associated with the customer's 1202 account with the bank 1220 to the customer 1202. In some embodiments, the ATM 1230 is capable of performing any authorized action associated with maintenance of the customer's 1202 account with the bank 1220. For example, the ATM 1230 may be capable of transferring money between accounts, accepting a deposit (e.g. cash or check) into the customer's 1202 account, providing a cash advance associated with a credit card, performing a currency exchange, or paying a bill, to name a few. In some embodiments, the ATM 1230 can include any type of vending machine configured to provide a product (e.g. a train ticket, an attraction ticket, food, a movie rental etc) and to obtain payment by accessing the customer's 1202 account with the bank 1220.

The ATM 1230 can include a machine-readable code interface 1214 for reading machine-readable codes and for presenting machine-readable codes to the customer 1202 or the mobile computing system 1210. Further, the ATM 1230 can include a transaction repository 1232. The transaction repository 1232 can include any repository for storing transaction details associated with an ATM transaction. In some embodiments, the transaction repository 1232 can store images of machine-readable codes.

Additionally, the ATM 1230 can include a machine-readable ATM identification code 1234. This machine-readable ATM identification code 1234 can be associated with one or more ATM details. These ATM details can include any information that can facilitate the customer 1202 using the ATM 1230, the bank 1220 generating an ATM specific machine-readable code associated with an ATM transaction request, or the bank 1220 authorizing completion of the ATM transaction request. For example, the ATM details can include a location associated with the ATM 1230, a bank associated with the ATM 1230, an ATM network associated with the ATM 1230, and a status associated with the ATM 1230, to name a few. In one embodiment, the machine-readable ATM identification code 1234 is physically attached to the ATM 1230, such as on a sticker or via an etching on the ATM 1230. Alternatively, the ATM 1230 presents the machine-readable ATM identification code 1234 to customers via the machine-readable code interface 1214.

In one embodiment, the ATM 1230 accesses a machine-readable code provided by the mobile computing system 1210. This machine-readable code is associated with ATM transaction information including an ATM transaction request and is generally generated by the bank 1220. The ATM 1230 can verify a signature associated with the machine-readable code. Additionally the ATM 1230 can identify at least the ATM transaction request and the bank 1220. The ATM 1230 may also identify an account associated with the customer 1202. Using this information, the ATM 1230 can contact the bank 1220 to verify that the bank 1220 and the customer 1202 have authorized performance or execution of the ATM transaction request. In one embodiment, the ATM 1230 may store the ATM transaction information in the transaction repository 1232 for record keeping purposes or for later account reconciliation. In one embodiment, the ATM 1230 decrypts the ATM transaction information to determine the information associated with the machine-readable code, such as the ATM transaction request, the identity of the bank 1220, and the customer's 1202 account name or number.

In one embodiment, once the ATM 1230 has performed the ATM transaction request, the ATM 1230 can provide the customer 1202 or the mobile computing system 1210 with a machine-readable code associated with an ATM transaction receipt via the machine-readable code interface 1214. Alternatively, the ATM 1230 can provide a traditional paper receipt.

In one embodiment, the customer 1204 can present a money slip 1250 to the ATM 1230. The money slip 1250 can represent any non-electronic medium, such as a piece of paper or card board, that can include a machine-readable code 1252. The machine-readable code 1252 can be associated with any pre-defined cash transaction. By presenting the money slip 1250 to the ATM 1230, the customer 1204 can withdraw or deposit the amount of money associated with the machine-readable code 1252. Generally, the money is withdrawn from an account associated with a different customer, such as the customer 1202, or an organization. However, the money could be withdrawn from an account associated with the customer 1204. In one embodiment, the machine-readable code 1252 is not associated with any particular customer. Thus, the customer 1204 can give the money slip 1250 to anyone as payment for a product or service or to cash or deposit on behalf of the customer 1204. Further, the customer 1204 can use the money slip 1250 to purchase any product or service from a retail store 102 that is willing to accept the money slip 1250 in lieu of an alternative payment method.

In one embodiment, the customer 1204 can cash or deposit the money slip 1250 directly at the bank 1220.

In one embodiment, the money slip 1250 can be electronic. The money slip 1250 can then be transferred between users, such as between the customer 1204 and the customer 1202, via any electronic method, such as email.

Example ATM Transaction Process from a Customer Perspective

Figure 13:
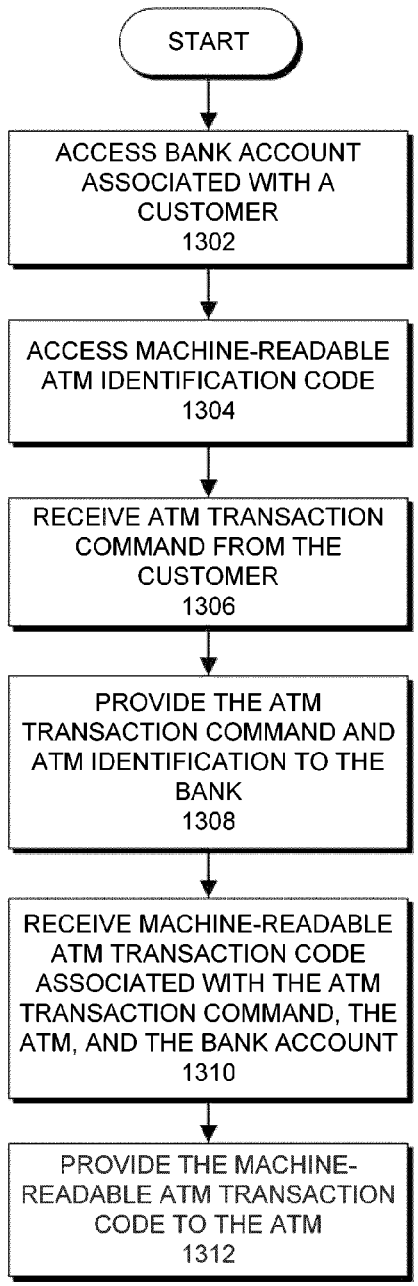
FIG. 13 illustrates a flow diagram for one embodiment of an ATM transaction process from a customer perspective.

FIG. 13 illustrates a flow diagram for one embodiment of an ATM transaction process 1300 from a customer perspective. The process 1300 can be implemented by any system that can access a customer's 1202 account associated with a bank 1220 via a network 140 and present a machine-readable code to an ATM 1230. For example, the process 1300, in whole or in part, can be implemented by the mobile computing system 1210, the machine-readable code interface 1214, or the client transaction processor 1212, to name a few. Although any number of systems, in whole or in part, can implement the process 1300, to simplify discussion, the process 1300 will be described as being generally implemented by the client transaction processor 1212. Advantageously, embodiments of the process 1300 enable the customer 1202 to interact with an ATM 1230 using a mobile computing system 1210 and without requiring the use of a debit card or credit card.

The process 1300 begins at block 1302, where, for example, the client transaction processor 1212 accesses a bank account associated with a customer 1202. In one embodiment, the bank account can be any type of account associated with a financial institution. For example, the bank account can be a credit account with a credit card company, a Certificate of Deposit account, an Individual Retirement Account, or any other type of account that enables the customer 1202 to withdraw and/or deposit money. In one embodiment, the bank account is accessed over the network 140 via a website associated with the bank 1220.

In one embodiment, accessing the bank account can comprise any number or type of authentication measures. For example, these authentication measures can comprise requiring a user name and password, or a biometric authentication. Further, accessing the bank account may comprise any type of security or encryption measures, such as the use of transparent client-side cryptography techniques. Examples of transparent client-side cryptography that can be used herein are described in U.S. application Ser. No. 12/981,247, filed Dec. 29, 2010, titled "Transparent Client-Side Cryptography for Network Applications," the disclosure of which is hereby incorporated by reference in its entirety.

At block 1304, the client transaction processor 1212 accesses a machine-readable ATM identification code 1234 associated with the ATM 1230 to determine an ATM identification. The machine-readable ATM identification code 1234 can comprise any type of machine-readable code. Accessing the machine-readable ATM identification code 1234 can comprise scanning the machine-readable ATM identification code 1234 using the machine-readable code interface 1214. Further, accessing the machine-readable ATM identification code 1234 can comprise translating the machine-readable ATM identification code 1234 into a human-readable form and presenting the human-readable form to the customer 1202, and/or translating the machine-readable ATM identification code 1234 into an optimal format to facilitate providing the machine-readable ATM identification code 1234 to the bank 1220. In one embodiment, block 1304 is optional.

At block 1306, the client transaction processor 1212 receives an ATM transaction request from the customer 1202. This ATM transaction request can comprise any type of command that can be performed by the ATM 1230. For example, the ATM transaction request can be a money-withdrawal request, a deposit check request, a deposit payment instrument request, or a deposit cash request, to name a few. Further, receiving the ATM transaction request can include receiving any ATM transaction request details that can facilitate performing the ATM transaction request. For example, these details can include the identity of one or more accounts or a monetary amount.

At block 1308, the client transaction processor 1212 can provide the ATM transaction request (and any ATM transaction request details) and the ATM identification to the bank 1220. In one embodiment, providing the ATM identification to the bank 1220 is optional.

At block 1310, the client transaction processor 1212 receives a machine-readable ATM transaction code associated with the ATM transaction request, the ATM 1230, and a bank account associated with the customer 1202. The machine-readable ATM transaction code can comprise any type of machine-readable code. In one embodiment, the machine-readable ATM transaction code is associated with the ATM transaction request and the bank account associated with the customer 1202, but is not associated with any particular ATM.

In one embodiment, the machine-readable ATM transaction code and or information associated with the machine-readable ATM transaction code may be signed and/or encrypted by the bank 1220. In one embodiment, the machine-readable ATM transaction code may be associated with an authorization code provided by the bank 1220. This authorization code can be associated with one or more of the ATM transaction request, the bank account, and the bank 1220. In one embodiment, the client transaction processor 1212 receives the authorization code in place of the machine-readable ATM transaction code. In response to receiving the authorization code, the client transaction processor 1212 generates the machine-readable ATM transaction code.

In one embodiment, the machine-readable ATM transaction code may be associated with an expiration value, such as a time value. In some embodiments, if the expiration value has been satisfied, the machine-readable ATM transaction code may no longer be valid (i.e. the ATM 1230 may no longer perform the ATM transaction request associated with the machine-readable ATM transaction code).

In one embodiment, the bank 1220 can cause any potential fees associated with the ATM transaction or performing the ATM transaction at the ATM 1230 to be presented to the customer 1202. If the customer 1202 indicates a desire to proceed, the bank 1220 can then provide the machine-readable ATM transaction code to the client transaction processor 1212 at block 1310.

At block 1312, the client transaction processor 1212 can provide the machine-readable ATM transaction code to the ATM 1230, which enables the ATM 1230 to process the ATM transaction request associated with the machine-readable ATM transaction code. Processing the ATM transaction request from the ATM's 1230 perspective is described further with respect to FIG. 14.

In one embodiment, the ATM transaction request can include a request to create a money slip 1250. In response to providing the machine-readable ATM transaction code to the ATM 1230 at block 1312, the customer 1202 can obtain a money slip 1250 created by the ATM 1230.

Example ATM Transaction Process from an ATM Perspective

Figure 14:
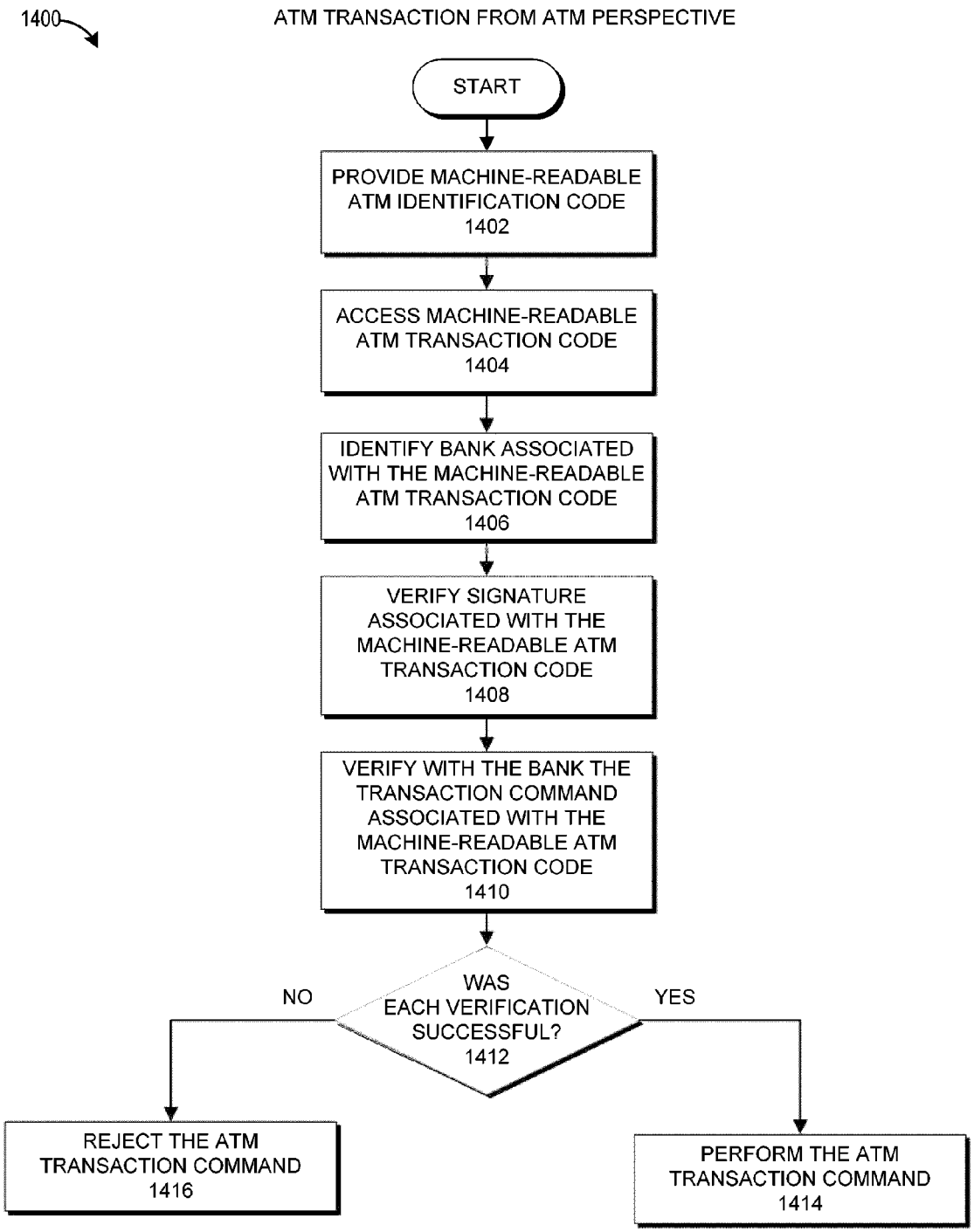
FIG. 14 illustrates a flow diagram for one embodiment of an ATM transaction process from an ATM perspective.

FIG. 14 illustrates a flow diagram for one embodiment of an ATM transaction process 1400 from an ATM perspective. The process 1400 can be implemented by any system that can execute a monetary transaction associated with a bank account for a customer 1202. For example, the process 1400, in whole or in part, can be implemented by the ATM 1230. Advantageously, embodiments of the process 1400 enable the customer 1202 to interact with the ATM 1230 using a mobile computing system 1210 and without requiring the use of a debit card or credit card.

The process 1400 begins at block 1402, where, for example, the ATM 1230 provides a machine-readable ATM identification code 1234 to one or more of the customer 1202 or the mobile computing system 1210. In one embodiment, block 1402 is optional and the process 1400 begins at block 1404. At block 1404, the ATM 1230 accesses a machine-readable ATM transaction code. This machine-readable ATM transaction code is associated with an ATM transaction request. In one embodiment, the machine-readable ATM transaction code is also associated with one or more of a bank 1220 and an account associated with the customer 1202 and the bank 1220. In one embodiment, accessing the machine-readable ATM transaction code can include decrypting the machine-readable ATM transaction code and/or information associated with the machine-readable ATM transaction code.

At block 1406, the ATM 1230 identifies the bank 1220 associated with the machine-readable ATM transaction code. At block 1408, the ATM 1230 verifies a signature associated with the machine-readable ATM transaction code. Verifying the signature can comprise one or more of verifying that the signature has not been tampered with, verifying that the signature is associated with a trusted party, and verifying that the signature is associated with the bank 1220.

At block 1410, the ATM 1230 verifies the transaction request associated with the machine-readable ATM transaction code with the bank 1220. In one embodiment, verifying the transaction request can comprise verifying that the bank 1220 authorized the transaction request and/or generated the machine-readable ATM transaction code. In one embodiment, verifying the transaction request can comprise verifying that an expiration value associated with the machine-readable ATM transaction code has not been satisfied. In one embodiment, the ATM 1230 can verify that an expiration value associated with the machine-readable ATM transaction code has not been satisfied without communicating with the bank 1220. In one embodiment, verifying the transaction request can include verifying a signature associated with the machine-readable ATM transaction code. In one embodiment, verifying the transaction request can include decrypting transaction data or information associate with the machine-readable ATM transaction code. In one embodiment, block 1410 may be performed at substantially the same time (e.g. within a matter of seconds or less) as block 1404. Alternatively, block 1410 may be performed at a substantially later time than block 1404 (e.g. minutes, hours, or days later). Advantageously, in embodiments where block 1410 is performed at a substantially later time, the process 1400 can be implemented by ATMs that may, at least temporarily, lack a network connection, such as an ATM temporarily installed at a state fair or an ATM on a cruise ship. In one embodiment, block 1410 is optional.

At decision block 1412, the ATM 1230 determines whether each verification process associated with blocks 1408 and 1410 was successful. If so, the ATM 1230 performs the ATM transaction request associated with the machine-readable ATM transaction code at block 1414. Performing the ATM transaction request can include dispensing cash to the customer 1202 or receiving cash or a check from the customer 1202. In one embodiment, performing the ATM transaction request can include accepting a money slip 1250 from the customer 1202 or dispensing a money slip 1250 to the customer 1202. In one embodiment, performing the ATM transaction request can include recording on the transaction repository 1232 one or more transaction details associated with the machine-readable ATM transaction code and/or ATM transaction request. In some embodiments, recording the transaction details enables block 1410 to be performed at an alternative time. Further, in some embodiments, recording the transaction details enables the bank 1220 to reconcile one or more ATM transactions at a predetermined time.

In one embodiment, the ATM transaction request may be limited by one or more of the ATM 1230 and the bank 1220. For example, the ATM transaction request may be limited to cash withdrawals of a predefined amount per customer or per account over a predefined period of time, per withdrawal, or per customer associated with a particular bank. Advantageously, in some embodiments, if network connectivity is limited or non-existent, the customer 1202 can withdraw at least a predefined amount of money from the ATM 1230 without the ATM 1230 confirming the ATM transaction request with the bank 1220. Thus, for example, if the ATM 1230 were located at a temporary event, the ATM 1230 could process certain transactions offline, without network access.

If the ATM 1230 determines that one or more verification process was not successful, the ATM 1230 rejects the ATM transaction request at block 1416. In one embodiment, rejecting the ATM transaction request can comprise informing the customer 1202, the bank 1220, or both that the ATM transaction request was rejected and, optionally, the reason why the ATM transaction request was rejected. In one embodiment, rejecting the ATM transaction request can include recording on the transaction repository 1232 one or more transaction details associated with the machine-readable ATM transaction code and/or ATM transaction request, and why the ATM transaction request was rejected.

Example ATM Transaction Process Using a Money Slip

In some embodiments, process 1400 can be used to process a money slip 1250. The following describes several such example embodiments of using the process 1400 to process the money slip 1250. Although these examples are described with respect to the ATM 1230, any system that can facilitate a retail transaction can perform the process 1400 to process the money slip 1250. For example, the point of sale system 112 can process the money slip 1250 using the process 1400.

The process begins at block 1404 when, for example the ATM 1230 accesses a machine-readable code 1252 associated with the money slip 1250 from a customer 1204. The machine-readable code 1252 includes a monetary value. In one embodiment, there is no limit to the monetary value or currency. For example, the monetary value could be $17.76 or € 18.12. In other embodiments, the monetary value may be limited by a maximum or minimum value. In some embodiments, the monetary value may be limited to one or more multiples of one or more predefined values (e.g. the monetary value must be divisible by twenty, or by ten and twenty). In one embodiment, the ATM 1230 may be capable of accepting money slips associated with specific values. For example, if the ATM 1230 only dispenses twenty dollar bills, the ATM 1230 may not be able to process a money slip 1250 associated with seventy-five dollars.

At block 1406, the ATM 1230 identifies a bank 1220 associated with the machine-readable code 1252. At block 1408, the ATM 1230 verifies a signature associated with the machine-readable code 1252. Verifying the signature comprises verifying that the bank 1220 signed the money slip 1250. The ATM 1230 verifies with the bank 1220 at block 1410 that the bank 1220 generated and/or authorized the money slip 1250 and/or the machine-readable code 1252.

At decision block 1412, the ATM 1230 determines whether the verification processes associated with the blocks 1408 and 1410 were successful. If so, the ATM 1230 can cash the money slip 1252 or deposit the money slip 1252 into an account identified by the customer 1204. Depositing the money slip 1252 can comprise depositing the monetary value associated with the money slip 1252. If one or more verification processes was not successful, the ATM 1230 will not cash or deposit the money slip 1252.

In one embodiment, the money slip 1250 can be generated by a third-party, such as the customer 1202 or the retail store 102. In one embodiment, generating the money slip 1250 comprises communicating with the bank 1220 a request to allocate funds from an account for the money slip 1250. If the funds exist, the bank 1220 can generate a machine-readable code 1252 to be included with the money slip 1250.

Example Network Authentication System

Figure 15:
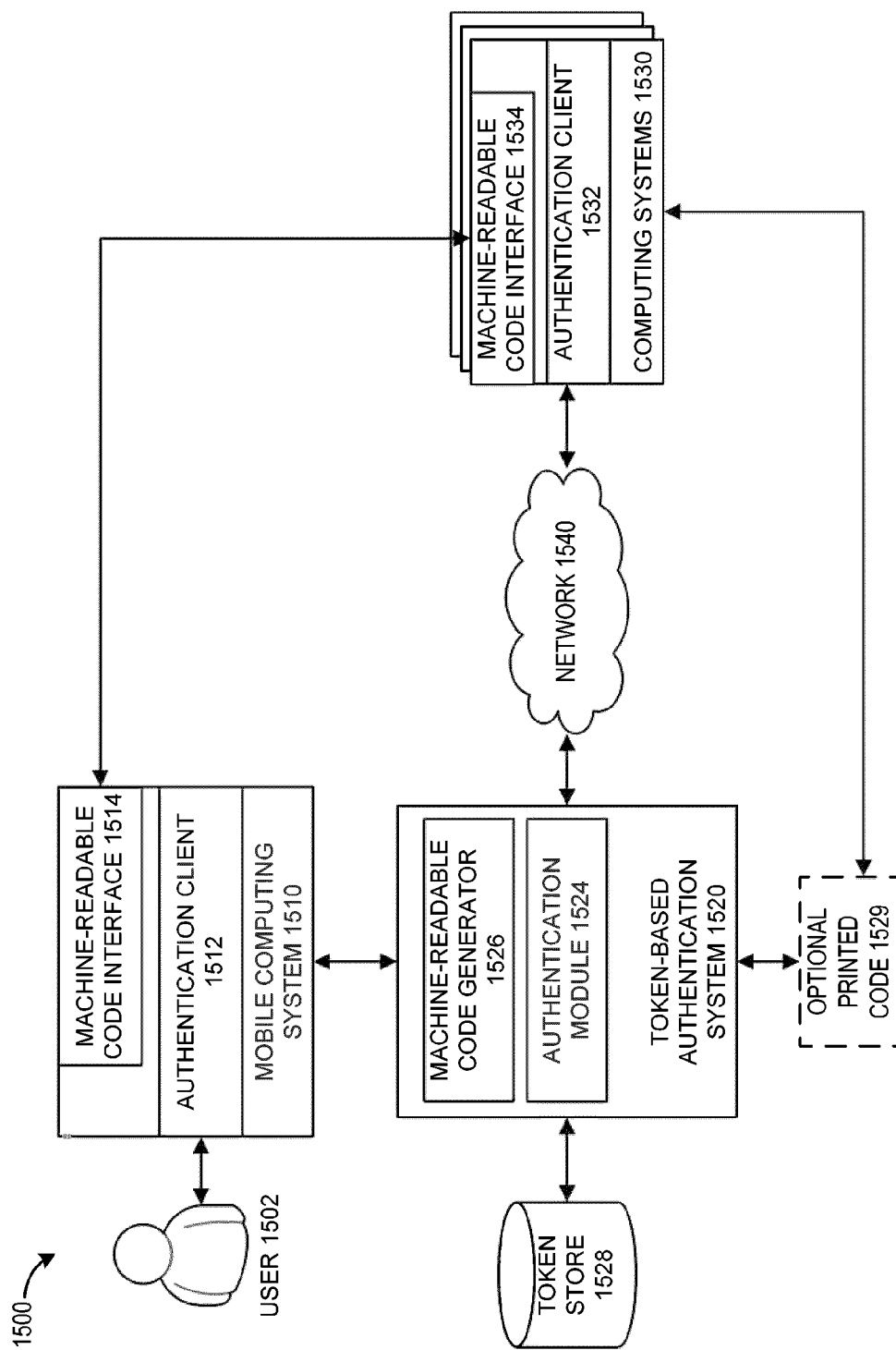
FIG. 15 illustrates an embodiment of a network authentication environment that can use machine-readable codes to facilitate network authentication.

FIG. 15 illustrates an embodiment of a network authentication environment 1500 that can use machine-readable codes to facilitate network authentication. In one embodiment, a user 1502 is associated with a mobile computing system 1510. The mobile computing system 1510 can generally include any type of mobile computing system including those described in relation to the mobile computing systems 110, 610, and 1210. Further, the mobile computing system 1210 includes an authentication client 1512 and a machine-readable code interface 1514. Like the machine-readable code interfaces described above, the machine-readable code interface 1514 can include any system configured to read or scan a machine-readable code.

The mobile computing system 1510 is shown communicating with a token-based authentication system 1520. In certain embodiments, the token-based authentication system 1520 can encode a network authentication token that can be used by the user 1502 (optionally in conjunction with a PIN) to authenticate to websites, local applications, devices, and network-accessible applications. In the depicted embodiment, tokens generated by the authentication system 1520 can be used to access computing systems 1530, examples of which are described below.

The token-based authentication system 1520 includes an authentication module 1524 and a machine-readable code generator 1526. The authentication module 1524 can implement a token-based authentication technology, such as Kerberos or the like. Kerberos and other authentication technologies issue time-limited authentication tickets or tokens that enable users to obtain access to multiple applications and devices. The machine-readable code generator 1526 can generate a machine-readable code for each token generated by the authentication module 1524. A token store 1528 or data repository in communication with the authentication system 1520 can store the tokens and/or machine-readable codes.

The authentication system 1520 can therefore enable the user 1502 to access multiple different computing systems 1530 or applications without having to enter security credentials (e.g., username and password) for each application or device. In one embodiment, the user 1502 enters his or her credentials in the mobile computing system 1510 using the authentication client 1512. The user 1502 can then use the authentication client 1512 to connect to the token-based authentication system 1520, e.g., over a network 1540. The authentication module 1524 of the authentication system 1520 can validate the user's 1502 credentials and generate a security token. The machine-readable code generator 1526 can encode this token into a machine-readable code and output the machine-readable code for the mobile computing system 1510 to scan (with the machine-readable code interface 1514). The machine-readable code generator 1526 can transmit the code to the mobile computing system 1510 in a variety of other ways, such as email, text, via a web page, or the like.

Using the machine-readable code, the mobile computing system 1510 can access computing systems 1530 and/or applications that are token-authentication enabled. For example, the user 1502 can present the machine-readable code received from the authentication system 1520 to a machine-readable code interface 1534 on a computing system 1530. An authentication client 1532 of the computing system 1530 can transmit the machine-readable code (or a decoded version thereof) to the authentication system 1520. The authentication system 1520 can check the code against its token store 1528 to determine whether the code corresponds to a valid token. If a valid token exists for the user 1502 to access the computing system 1530, the authentication system 1520 can send a communication to the authentication client 1532 of the computing system indicating that the user 1502 is authorized.

One specific use case for the network authentication environment 1500 is in a warehouse setting, where workers are highly mobile and are interacting with network-accessible applications, such as inventory stowing and picking applications. A worker (e.g., user 1502) could, at the beginning of shift, authenticate using traditional authentication means (username and password, RSA token, or otherwise). Upon successful authentication, the user receives an authentication token from the authentication system 1520. This token could be provided to the user's 1502 mobile computing system 1510. Alternatively, this token could be printed as a machine-readable code (1529), whereupon the employee could affix the machine-readable code to his or her badge. Later and for the duration of the shift, for example, the employee could use this machine-readable code by scanning it with a fixed or mobile device (such as the computing systems 1530). The authentication client 1532 could include web browser software capable of processing the security token, for example, to authenticate to web sites configured to accept such tokens. The token could expire N hours, minutes, or days after creation such that a token generated for use one day would be invalid on subsequent days.

Similar use cases apply in other non-warehouse settings; for example, any employee interacting with multiple networked devices may find this mechanism easier to use than, for example, entering a password on a mobile device. In the healthcare industry, for example, doctors and nurses are highly mobile but networked healthcare applications are extremely cautious to require authentication at each interaction. The network authentication environment 1500 shown can be implemented in a hospital or other care setting to enable authentication to multiple devices while reducing the burden on employees.

In the above examples, this authentication mechanism could also be used to enforce a stronger authentication mechanism (biometric, Q&A, human interaction) on a periodic (e.g. daily) basis without requiring ubiquitous deployment of such authentication. For instance, the user 1502 could supply biometric credentials to the authentication system 1520, which could create a token and issue a corresponding machine readable code (printed 1529 or supplied to the mobile computing system 1510). The authentication process used by the authentication could also be reversed—for example, the authentication system 1520 could provide a machine-readable code for each token generated to the computing systems 1530. A user 1502 wishing to authenticate to a computing system 1530 could scan the machine readable code displayed by the computing system 1530 and send the code to the authentication system 1520, which could validate the user and send a message regarding this validation to the computing system 1530.

Further, in some embodiments, the token can be time-limited, and the expiration time can be encoded in the machine-readable code. In addition, a second factor (or more than two factors) of authentication can be used to enhance security. For example, the authentication system 1520 could enable a second authentication factor such as a personal identification number (PIN) or password to be defined for a user. When the user scans the machine-readable code containing the token into the computing system 1530, the authentication client 1532 of the computing system 1530 could output a user interface that requests a PIN or other password of the user. Upon inputting the user's PIN or password (or other authentication factor), the authentication module 1532 could submit the PIN/password and the machine-readable code (or security token embedded therein) to the authentication system 1520 for authentication. This two-factor authentication scheme can allow users to have an authentication mechanism such as a PIN, which may change infrequently, as well as a second authentication mechanism (the security token) that can change more frequently, such as daily. Thus, for instance, a user in a high security facility who has a PIN may also be assigned a new machine-readable code each day he or she reports to work.

Moreover, in some embodiments, the computing systems 1530 can perform offline authentication or validation, e.g., without accessing the authentication server 1520. In such embodiments, the machine-readable code can include an encrypted security token. The security token may further be signed with a private key used by the authentication server 1520. Upon scanning the machine-readable code, a computing system 1530 can decrypt the security token and check the signature using, for example, a public key corresponding to the private key used by the authentication system 1520 to sign the security token. If the computing system 1530 determines that the signature is valid, the computing system 1530 can provide the user with access the computing system 1530. Thus, the computing system 1530 need not communicate with the authentication server 1520 in some embodiments.

Terminology

A number of computing systems have been described throughout this disclosure. The descriptions of these systems are not intended to limit the teachings or applicability of this disclosure. For example, the mobile computing systems described herein can generally include any mobile computing device(s), such as smart phones, PDAs, tablets, or the like. Further, it is possible for the mobile computing systems described herein to be different types of devices, to include different applications, or to otherwise be configured differently. In addition, the mobile computing systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 3, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of reordering a product, the method comprising:
   by a mobile device comprising one or more processors:
      accessing a machine-readable code comprising product reorder details for a product and a user identifier for a user, the product reorder details associated with the user and including user-specific reordering information;
      extracting the product reorder details from the machine-readable code associated with the product;
      initiating a transaction with a product provider to reorder the product by providing the product reorder details to a remote server associated with the product provider;
      receiving an indication that the product is no longer available;
      sending the user identifier to the remote server thereby enabling the product provider to recommend an alternative product tailored to the user;
      receiving an identity of the alternative product;
      presenting the identity of the alternative product to the user; and
      in response to receiving confirmation that the alternative product is acceptable to the user:
         updating the transaction to purchase the alternative product; and
         receiving a confirmation from the product provider that the transaction was completed,
         wherein said accessing the machine-readable code occurs prior to the user's supply of the product being exhausted.

2. The method of claim 1, further comprising identifying the product provider based on the product reorder details.

3. The method of claim 1, wherein the product can be a service.

4. The method of claim 1, wherein the identity of the alternative product comprises one or more personalized product recommendations; special offers; discount offers; price information; quantity information; and product reviews.

5. The method of claim 1, wherein accessing the machine-readable code further comprises scanning the machine-readable code.

6. The method of claim 1, wherein the product reorder details are associated with an existing user-account.

7. The method of claim 1, the method further comprising receiving a confirmation indicating that the alternative product has been shipped.

8. The method of claim 1, further comprising:
   determining whether the machine-readable code has been accessed a threshold number of times; and
   in response to determining that the machine-readable code has been accessed the threshold number of times, preventing completion of the transaction with the product provider.

9. The method of claim 8, wherein determining whether the machine-readable code has been accessed the threshold number of times further comprises determining whether the machine-readable code has been accessed the threshold number of times within a time period.

10. The method of claim 1, further comprising providing the user with a reminder to access the machine-readable code at a time prior to said accessing the machine-readable code.

11. A system for reordering a product, the system comprising:
   a mobile device comprising one or more processors, wherein at least one of said processors is configured as a client transaction processor, the client transaction processor configured to:
      access a machine-readable code comprising product reorder details for a product and a user identifier for a user, the product reorder details associated with the user and including user-specific reordering information;
      extract the product reorder details from the machine-readable code associated with the product;
      initiate a transaction with a product provider to reorder the product by providing the product reorder details to a remote server associated with the product provider;
      receive an indication that the product is no longer available;
      provide the user identifier to the remote server thereby enabling the product provider to recommend an alternative product tailored to the user;
      receive an identity of the alternative product;
      cause the identity of the alternative product to be presented to the user; and
      in response to receiving confirmation that the alternative product is acceptable to the user:
         update the transaction to purchase the alternative product; and
         receive a confirmation from the product provider that the transaction was completed,
      wherein said accessing the machine-readable code occurs prior to the user's supply of the product being exhausted.

12. The system of claim 11, wherein the client transaction processor is further configured to identify the product provider based on the product reorder details.

13. The system of claim 11, wherein the client transaction processor is further configured to access the machine-readable code using an optical scanner.

14. The system of claim 11, wherein the client transaction processor is further configured to receive a confirmation that the alternative product has been shipped.

15. A method for reordering a product, the method comprising:
   providing a machine-readable code to a customer, the machine-readable code comprising product reorder details for a product and a customer identifier for the customer, the product reorder details associated with the customer and including customer-specific reordering information, thereby enabling the customer to reorder the product by scanning the machine-readable code with a mobile device;

receiving reorder data representing a scanned version of the machine-readable code, the reorder data comprising a transaction request for the product and including the customer identifier;

determining the availability of the product in response to receiving the reorder data; and in response to determining that the product is no longer available:

providing the customer with an indication that the product is no longer available;

identifying an alternative product to recommend to the customer based, at least in part, on the customer identifier;

providing the customer with an identity of the alternative product tailored to the customer;

receiving updated reorder data, the updated reorder data comprising a transaction request to purchase the alternative product; and providing the customer with confirmation of the transaction request to purchase the alternative product.

16. The method of claim 15, further comprising:

determining if the reorder data was previously received prior to determining the availability of the product; and in response to determining that the reorder data was previously received, modifying a transaction associated with the transaction request for the product.

17. The method of claim 16, wherein modifying the transaction request for the product comprises one or more of the following: cancelling the transaction request for the product; confirming the transaction request for the product with the customer; preventing future transactions associated with the machine-readable code; and preventing future transactions associated with the machine-readable code for a predefined period of time.

18. The method of claim 15, further comprising confirming the transaction request to purchase the alternative product with the customer via one or more of email; text message; phone call; instant message; or an update to an account page associate with the customer.

19. The method of claim 15, further comprising determining transaction details associated with the reorder data and using the transaction details to complete the transaction for the alternative product.

20. The method of claim 19, wherein at least some of the transaction details are extracted from the scanned machine-readable code.

21. The method of claim 19, wherein at least some of the transaction details are retrieved from a storage location determined based on the scanned machine-readable code.

* * * * *